United States Patent
Kristjánsson

(10) Patent No.: US 10,084,650 B2
(45) Date of Patent: Sep. 25, 2018

(54) GRAPHICAL USER INTERFACE FOR CUSTOMIZING GRAPHICAL REPRESENTATIONS BASED ON REGISTRY DATA

(71) Applicant: Tail-f Systems AB, Stockholm (SE)

(72) Inventor: Helgi Kristjánsson, Djursholm (SE)

(*) Notice: Subject to any disclaimer, the term of this patent is extended or adjusted under 35 U.S.C. 154(b) by 513 days.

(21) Appl. No.: 13/937,926

(22) Filed: Jul. 9, 2013

(65) Prior Publication Data
US 2015/0019991 A1    Jan. 15, 2015

(51) Int. Cl.
  *G06F 3/048* (2013.01)
  *H04L 12/24* (2006.01)

(52) U.S. Cl.
  CPC .......... *H04L 41/0853* (2013.01); *H04L 41/22* (2013.01)

(58) Field of Classification Search
  CPC combination set(s) only.
  See application file for complete search history.

(56) References Cited

U.S. PATENT DOCUMENTS

| | | | |
|---|---|---|---|
| 6,330,231 B1* | 12/2001 | Bi | H04L 67/06 370/328 |
| 8,448,076 B2* | 5/2013 | Hammack et al. | 715/763 |
| 2002/0049749 A1* | 4/2002 | Helgeson et al. | 707/3 |
| 2003/0229529 A1* | 12/2003 | Mui et al. | 705/8 |
| 2004/0041833 A1* | 3/2004 | Dikhit | H04L 41/12 715/738 |
| 2007/0061486 A1* | 3/2007 | Trinh et al. | 709/246 |
| 2008/0127057 A1* | 5/2008 | Costa | G06F 8/34 717/106 |
| 2010/0169755 A1* | 7/2010 | Zafar | G06Q 10/00 715/205 |
| 2010/0262477 A1* | 10/2010 | Hillerbrand et al. | 705/14.16 |
| 2010/0275139 A1* | 10/2010 | Hammack et al. | 715/763 |
| 2011/0191303 A1* | 8/2011 | Kaufman | G06F 17/30286 707/684 |
| 2012/0235921 A1* | 9/2012 | Laubach | 345/172 |
| 2012/0290940 A1* | 11/2012 | Quine | 715/744 |
| 2013/0124523 A1* | 5/2013 | Rogers et al. | 707/737 |
| 2013/0179842 A1* | 7/2013 | Deleris et al. | 715/853 |
| 2013/0265905 A1* | 10/2013 | Filsfils | 370/253 |
| 2014/0130035 A1* | 5/2014 | Desai et al. | 717/172 |
| 2015/0058314 A1* | 2/2015 | Leclerc et al. | 707/711 |

* cited by examiner

*Primary Examiner* — Andrey Belousov
*Assistant Examiner* — Haimei Jiang
(74) *Attorney, Agent, or Firm* — Polsinelli PC

(57) ABSTRACT

The present invention pertains to a method for providing a customizable user interface capable of auto rendering data models of a data network, for monitoring and management purposes a data network so as to allow for management of boilerplate operations such as logon/logout, fetching and storing data, executing actions and transactions management. The method comprising the steps of: storing: a data model having a plurality of elements and sub-elements representative of the data network, a widget library, default registry data, customization registry data. The method further comprises the steps generating, a request for a portion of the data model representative for a part of the network of interest for display in the customizable user interface, selecting a graphical representations for each element and sub element based on the customization registry data and the default registry data and rendering the part of the data network using the selected graphical representations.

24 Claims, 15 Drawing Sheets

```
{
    'bundle': {
        'tag': {
            'keypath/tagpath': {
                'key': registration
            }
        }
    }
}
```

101' — FIG 7A ← Registry entries

```
// English (bundle)
'en_US': {

// Global translation using only a key:
  // This will translate all occurrencies "chassis", wherever they
appear.
  // This is a wide targeting method and has the lowest priority.
  'chassis': 'Chassis'
}
```

102' — FIG 7B ← Registry entries

```
// English (bundle)
'en_US': {
  // Tagpath targeting:
  // A tagpath is used to target all instances of the "name" leafs etc. It is
  // done using a tagpath since "slot" and "interface" are lists.
  // a) Tagpath pointing to the "name" leaf
  '/config:chassis/slot/interface/name': { // tagpath
    'name': 'Interface name'
  },
  // b) Tagpath pointing to the "tx" leaf
  '/config:chassis/slot/interface/tx': { // tagpath
    'tx': 'Transmitted packets'
  }, // Keypath targeting:
  // A keypath points to exactly one instance. This is the second
  // most specific targeting method.

// c) Target a leaf at a specific place in a list
  '/config:chassis/slot{1}/interface{eth1}/name': {
    'name': 'Backup interface name'
  }, // d) Target a leaf in a container
  '/config:settings/logging-enabled': {
    'logging-enabled': 'Enable logging'
  }
  // e) Target using a view tag and keypath
  'mobile': {
    '/config:settings/logging-enabled': {
      'logging-enabled': 'Logging enabled'
    }
  }
}
```

103' — Registry entries

FIG 7C

```
Widget registration examples:
// Bundle:
// The types bundle contains widgets for rendering data types, such as
// boolean, strings, uint32 etc.
'types': {
 'string': { // key
   type: 'tailf.widgets.Text',
   template: 'templates/text.html'
 },
 'boolean': { // key
   type: 'tailf.widgets.Boolean',
   template: 'templates/boolean.html'
 }
},
// The "pages" bundle
'pages': {
 'calendar.month': {    // view (tag)
   '/calendar:events': { // keypath
     'calendar': {     // key
       type: 'tailf.widgets.calendar.Month',
       templates: 'templates/calendar/month.html'
     }
   }
 },
 'calendar.week': {    // view (tag)
   '/calendar:events': { // keypath
     'calendar': {    //key
       type: 'tailf.widgets.calendar.Week',
       templates: 'templates/calendar/week.html'
     }
   }
 }
}
```

104' — Registry entries

FIG 7D

```
widgets': { // bundle
 'list': { // key
   type: 'tailf.widgets.List',
   template: 'templates/list.html'
 },
 // The "dashboard" view identifies an alternative way of viewing
 // data in the "interface" list. The data that is populated in this list
 // is defined using a specific query registered in the "config.js" file
 // (see below):
 'dashboard': { // view (tag)
   '/config:chassis/slot/interface': { // tagpath to list
     'list': {  // key
       type: 'tailf.widgets.ListOfBrokenInterfaces',
       template: 'templates/list-of-broken-interfaces.html'
     }
   }
  }
}
```

105' ⟵

⟵ Registry entries

FIG 7E

```
Overridable settings in "config.js"
{
 dataModel: {
  'dashboard': { // view (tag)
   '/config:chassis/slot/interface': { // tagpath to list
    'list': {
     // Select "name" and "ip" of all interfaces that
     // are broken (i.e. "failure = true").
     'query': tailf.query(function() {
      this
       .select('name','ip')
       .from('/config:chassis/slot/interface')
       ._limitExp(
        this.exp.eq('failure', true)
       )
     })
    }
   }
  }
 }
}
```

105″ ⟵

Registry entries ⟶

FIG 7F

```
'inline-types': { // BUNDLE
    'ncs.alarms': { // VIEW TAG
        '/al:alarms/alarm-list/alarm': { // KEYPATH
            'inline-table': { // KEY
                // ..Content of registration
                type: 'ncs.widgets.AlarmTable'
                , template: 'templates/alarms/alarm-table.html'
                , options: {
                    showNumbers: false
                    , handleTemplate: 'custom/ncs/templates/alarms/handle-multiple.html'
                }
            }
        }
    }
}
```

106'

Registry entries

FIG 7G

GRAPHICAL USER INTERFACE FOR CUSTOMIZING GRAPHICAL REPRESENTATIONS BASED ON REGISTRY DATA

TECHNICAL FIELD

The invention relates in general to the field of network management systems, and in particular to a method, a computer program and a system for providing a customized graphical user interface for monitoring, configuration and testing network of devices and network services.

BACKGROUND

Monitoring and administration of data networks and the separate nodes of the data networks are typically performed by a combination of hardware and software components referred to as a network management system (NMS).

Installation and removal of data network nodes (sometimes referred to as "devices") as well as creation, manipulation or deletion of services in the data network require the NMS to enable reconfiguration of the network nodes.

Monitoring what configuration changes should be made and what configuration changes have been made to the data network nodes of the network is not a trivial task. Nor is it a trivial task to implement the desired configuration of the data network nodes in an efficient manner.

One known way of reconfiguring a network node is to connect and logon to the network node, and to manually enter CLI (command line interface) commands on the integrated command-line interface of the node. However, this process of "locally" reconfiguring network nodes using CLI commands is very time consuming, in particular if the network comprises a large number of network nodes and/or if many configuration parameters are to be changed.

Another and more automated way that allows "remote" reconfiguration of network nodes is to use scripting. However, different nodes speak different languages due to differences in their command-line interfaces. Therefore, the configuration parameters must be embedded in scripts that are individually adapted to the different network nodes in order for the network nodes to understand what configuration changes are to be made. Creating the node-specific scripts, or a script that is interpretable by all nodes of the network, is also a very time consuming process.

There is software for automatic generation of reconfiguration scripts which eliminates the time consuming process of manual scripting. However, such software is developed to support reconfiguration of specific types of network nodes, e.g. a specific router from a specific manufacturer, and cannot be used to generate reconfiguration scripts which are interpretable by all data network nodes normally comprised in larger data networks.

There is user interfaces, such as web based user interfaces, for network devices and network services. However, such user interfaces are typically manually configured based on a specific setup of network and associated services. This means that there is a very long lag time between the time changes in the network or associated services is implemented and time where such changes is accounted for and appropriately reflected by the user interface. This is especially problematic for large scale networks.

Yet another problem associated with known solutions for providing user interfaces for network management is that since networks of today typically is quite complex naming conventions of properties of the network/service may differ meaning that one and the same property may be named differently.

Thus, changes in the user interface may result in unintended graphical representations of one or more device/services or elements thereof.

Thus, there is a desire to facilitate the process related to monitoring, configuration, and testing, of network devices and network services such that the process efficiently can be tailored to suit needs/requirements of different network operators and/or network service providers.

SUMMARY

It is an object of the present invention to eliminate or at least mitigate at least some of the above mentioned problems relating to monitoring and reconfiguration of data network nodes in a data network.

This is achieved by a method for providing a customizable user interface in a user equipment associated to a network management system for monitoring and configuring a data network comprising the steps of storing a data model representative of the data network, wherein said data model having a plurality of elements and sub elements, each associated to a data type of a set of data types, a default widget library comprising a plurality of widgets, default registry data, having entries identifying for each data type of the set of data types, a default graphical representation, in the form of at least one predetermined widget from the default widget library, customization registry data, having at least one entry, defining at least one key with an associated customization registration, said at least one key identifying at least one element and/or sub element of the data model for which an alternative graphical representation as defined by customization registration is to be provided. The method further comprises the step of receiving a user input, identifying a portion of the data network of interest for display in the user interface. The method further comprises the step of generating, a request for data from the data model based on the received user input. The method further comprises the step of receiving data from the data model, said received data being representative for the portion of the data network of interest for display. The method further comprises the steps of selecting, the alternative graphical representation for each element of the received data, having associated the at least one key and the default graphical representation for each element of the received data, not having associated the at least one key, and rendering, in the user interface, the portion of the data network of interest using the selected graphical representations.

By using default and customization registry data defining different aspects of graphical representation intended to represent the structural elements sub-elements of the data model and by means of prioritizing customization registry data over default registry data during selection/configuration of graphical representations for the structural elements sub-elements of the data model customizations can be tailored for different operators of the data network and/or associated services with a minimal effort. Instead on designing/programming an entire customized user interface for each of the different operators the above described method allows for creating a customized user interface solely based on configuration the desired customization and relying on the default configuration as defined by the default registry data for remaining parts for which no customization is desired. The customized graphical user interface facilitates for users to manage/monitor the data network since it can be adapted to meet the individual needs of different operators. The customization features make it easy to render a custom user experience by reusing auto rendered parts and creating custom components where needed.

Furthermore, since large scale data networks typically undergo quite frequent reconfigurations typically a graphical user interface and especially a customized user interface need to be adapted to take into account these reconfigurations so as to accurately reflect the current configuration of the data network. This is a resource demanding work task which drives the focus of service operators and network operators away from their core operations i.e. management/monitoring of the data network or services. Instead they are required to spend a vast amount of time updating the user interfaces so that they reflect the latest configuration of the data network. This problem is virtually non-existing when using a user interface provided by the present invention since the method uses information derived directly from the data model for providing the graphical user interface. In more detail, since the data model reflects the current configuration of the data network the method is always able to present a user interface reflecting the latest configuration based on using the information from the data model and the default configuration registry. Thus, by using the user interface of the present invention there is no need to perform updates of the software involved in generating the user interface which is not the case for user interfaces according to prior art.

Furthermore, the process of generating the graphical user interface is entirely automated. The method is capable of automatically generating a graphical user interface based on for example a YANG data model describing the data network and services configured therein. The Yang data model has a plurality of YANG schemas descriptive of devices and services of the data network. Accordingly, the structural element and supplements may be a module, a container, a leaf, a list, a leaf list, an action.

Preferably, the method further comprises the steps of storing information comprising a configuration data base, said configuration data base comprising information related to configuration parameters associated to the data model. This means additional information in the form of data from the configuration data base is available for use when selecting/configuring/rendering graphical representations reflecting the elements and sub-elements information from the data model. The additional information may for example include number of instances and identities of the instances and other configuration properties to be reflected by means of the graphical representations such as associated ip address, port number etc.

In order to provide targeted customizations, the at least one key of customization registry data may be defined together with information pointing more specifically to one or more unique structural elements and/or supplements of the data model. This information may for example be resource identifiers identifying a search path to a resource. The resource identifiers may for example be a keypath and/or a tagpath statement. The keypath statement provides a search path identifying one unique structural element, such as one unique instance for example a leaf of a specific data type at specific place in a list. This allows targeting this particular leaf with a customization instead of targeting all leafs of the same data type as or with the name associated to the particular leaf as would be the case if only a key would be used. The tagpath statement provides a search path identifying all instances of a certain structural element such as for example all instances of leafs of a certain list. This provides means for pinpointing customization to particular elements, or in more detail one or more instance thereof, of the data model. This allows for example to redefine a name and/or alter widget of a leaf which is automatically rendered by means of the default registry data without affecting other leafs with the same name.

The customization registry data may also include one or more entries, also referred to as tag statement entries or view angle entries, defining a context of the graphical user interface where a certain customization registration is be provided. In more detail this allows to define that one and the same structural element and/or sub-element should appear different in different views of the graphical user interface. For example a certain structural element and/or property thereof could be graphically represented as a calendar widget with resolution to months in one view and as a calendar widget with resolution set to weeks in another view. The views may for example be configured to shift by means of pressing a toggle button included in the user interface.

The customization registry data may also include one or more entries, also referred to as matcher function entries, operable using one or more conditional operators and/or logical operators on at least one entry selected from a group of entries comprising at least one keypath statement or at least one tagpath statement, at least one bundle statement, at least one tag and at least one key so as to identify at least one unique element and/or unique sub-elements for which customization as defined by the customization registration is to be provided.

The customization registry data may also include one or more entries, having a customization registration which is related to a predetermined translation altering the graphical representation of at least one element or sub-element with regard to textual representation of at least one label or at least one argument of the at least one element or sub-element.

The customization registry data may also include one or more entries, having a customization registration which is related to at least one customization selected from a group of customizations comprising a predetermined translation, a widget life cycle handler and a widget contextual setting, said customizations altering the graphical representation of at least one element or sub-element with regard to at least one property of a number of properties comprising life cycle behaviour, textual representation and graphical appearance.

The method may further comprise the step of storing a custom widget library comprising at least one custom widget. This allows the use of custom widgets as graphical representations for one or more structural element by means of defining one or more entry of the customization registry data to point to said at least one custom widget for one or more structural element.

This is also achieved by a method for providing a customizable user interface in a web browser of a client, said customizable user interface being associated to a network management system for monitoring and configuring a data network, comprising the step of: storing, at a server, a data model representative of the data network, wherein said data model having a plurality of elements and sub elements, each associated to a data type of a set of data types. The method further comprises the steps of: storing, at the client, information comprising: a default widget library comprising a plurality of widgets; default registry data, having entries identifying for each data type of the set of data types, a default graphical representation, in the form of at least one predetermined widget from the default widget library; customization registry data, having at least one entry, defining at least one key with an associated customization registration, said at least one key identifying at least one element and/or sub element of the data model for which an alternative graphical representation as defined by customization registration is to be provided. The method further comprise the step of displaying, a user input dialog in the web browser, said user input dialog configured to allow a user to identify a portion of the data network of interest for display in the user interface. The method further comprises the step of receiving, at the client, a user input, identifying the portion of the data network of interest for display in the user interface. The method further comprises the step of generating, at the client, a request to the server for data from the data model based on the received user input. The method further comprise the step of receiving, at the client, data sent from the server, said received data being representative for the portion of the data network of interest for display. The method further comprises the steps of selecting, at the client, the alternative graphical representation for each element of the received data, having associated the at least one key and the default graphical representation for each element of the received data, not having associated the at least one key and rendering, in the user interface in the web browser of the client, the portion of the data network of interest using the selected graphical representations.

According to another aspect of the invention, a user interface providing for monitoring/management of a data network is provided. Said user interface being provided in a user equipment being associated to a network management system (NMS). The user interface of the user equipment comprises various components that will be described in the detailed description following hereinafter, which components are configured to cause the user interface of the user equipment to automatically carry out the steps of the above described method.

The main components of the user interface are:
 a link, a link communicatively coupling the user interface to a storage medium of the network management system, said storage medium of the network management configured to store a data model representative of the data network, wherein said data model having a plurality of elements and sub elements, each associated to a data type of a set of data types;
 a storage medium, storing a default widget library comprising a plurality of widgets; default registry data, having entries identifying for each data type of the set of data types, a default graphical representation, in the form of at least one predetermined widget from the default widget library; customization registry data, having at least one entry, defining at least one key with an associated customization registration, said at least one key identifying at least one element and/or sub element of the data model for which an alternative graphical representation as defined by customization registration is to be provided; and
 a client, such as a client operated by the user equipment, said client configured to: generate a user input dialog so as to allow an operator identifying a portion of the data network of interest for display in the user interface; receive the user input identifying the portion of the data network of interest; generate a request for retrieving data, from the storage medium of the network management system, based in the received user input; receive the requested data from storage medium of the network management system, said received data being representative for the portion of the data network of interest for display; select the alternative graphical representation for each element of the received data, having associated the at least one key and the default graphical representation for each element of the received data not having associated the at least one key; and render the portion of the data network of interest using the selected graphical representations.

The user interface is typically implemented by means of a combination of hardware and software and so comprises at least a digital storage medium for storing a computer program, and a processing unit for executing the computer program. The computer program comprises computer-readable code which when executed by the processing unit of the user equipment associated to the user interface causes the user equipment to carry out the steps of the method.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein:

FIGS. 7A to 7G illustrate different examples of registry entries used for targeted customizations.

DETAILED DESCRIPTION

Figure 1:
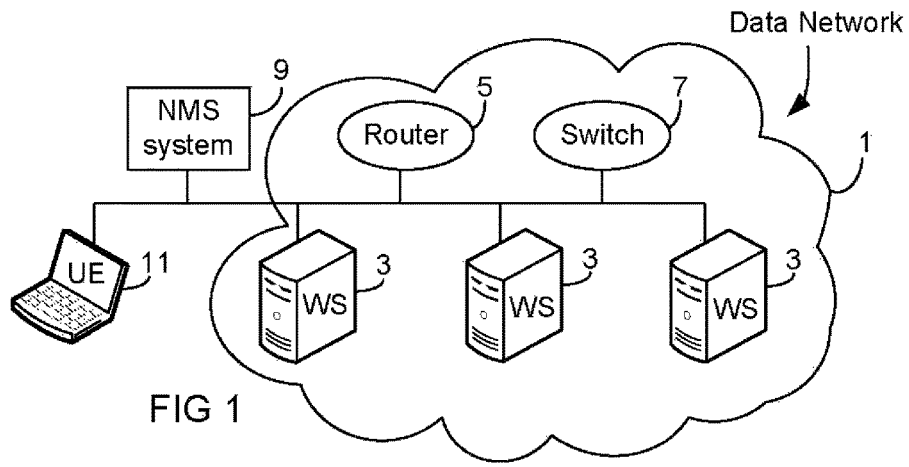
FIG. 1 schematically illustrates an example of a data network and a network management system according to the invention.

The figures are schematic and simplified for clarity reasons, and they merely show details which are essential to the understanding of the invention, while other details have been left out. Throughout the following description, the same reference numerals are used for identical or corresponding parts or steps.

The present invention provides a solution to the problem of facilitating for at least one user/operator of a data network and/or associated configurable services or other interested party to get a user centric overview over a data network having a large number of devices and services so as to effectively being able to manage boilerplate operations, such as logon/logout, fetching and storing data, executing actions and transactions management. In order to address the problem the present invention provides a graphical user interface operating according to a client-server model, wherein one or more client communicates remotely with a server of a network management system in order for the one or more client to automatically render a graphical representation providing an overview of selected parts of said data network and associated services based on data received from the server, a widget library, a mapping table mapping/linking one or more widget of the widget library to default data types of said data received at the client from the server. Said data received at the one or more clients being accessible by said server and representative of properties of the data network and the configurable services. The data may for example be stored in at least one memory of the network management system. The data may for example be YANG schemas, such as YANG (RFC 6020) schemas, as defined by NETCONF Data Modeling Language Working Group (NETMOD), wherein said schemas comprise information descriptive o, (i.e. modelling) the data network and the associated configurable services in terms of network topology, device specific data etc. The data may also be configuration data associated to the data network and/or associated services modelled by the YANG schemas.

Apart from automated rendering of selected data representative of a part of the data network, such as selected portions of one or more YANG schemas, as requested by a user interacting with said one or more client, the graphical user interface provided by each of the one or more clients is also individually adaptable by means of customization configuration data individually adapted for each of the one or more clients, wherein said customization configuration data is able to accurately pinpoint specific parts/components of the one or more YANG schemas for which a customization is desired.

The automatically rendered graphical user interface of the present invention having customization capabilities facilitates the process of creating graphical user interfaces, which are user centric/customer centric, meaning that the graphical user interfaces quickly with ease can be individually tailored to suit the need of each actor involved in managing/monitoring the data network, services in the data network, such as for example a network operator or a service provider. Examples of customizations include language customization, naming conventions customization, widget customization, user view customization, theming customization.

Accordingly, by means of being able to accurately pinpoint portions of the data network and/or associated services for which a customized graphical representation is desired by a particular actor and by means using the automatically rendered graphical representation as defined by the widget library and the mapping table for the remaining portions of the data network a customized user experience can be created rapidly with minimal efforts with respect to programming of the graphical user interface for each actor.

Furthermore, by means of using the automatically rendered graphical representation of the data network and/or associated services consistency with the latest configuration of the data network and/or associated services is always assured since the automatically rendered graphical representation of the data network and/or associated services is based on the YANG schemas reflecting the current configuration of the data network and/or associated services. This means that there is a minimal effort involved in maintenance of the graphical user interface in view of changes in the data network and/or in view of changes of the associated services. Thus, instead of focusing on creation/reprogramming of graphical user interfaces which is a vastly time consuming operation, network operators and/or service providers can instead shift their focus to managing/monitoring the data network and/or the associated services.

Also since the present invention is able to accurately pinpoint portions of the data network and or associated services to be displayed in the graphical user interface which are to be subject to a customized graphical representation the risk of customized graphical representation propagating erroneously to other parts of the data network and or associated services not to desired to be subject to customization is minimized.

FIG. 1 illustrates schematically a data network 1 in which the present invention may be implemented. The data network 1 comprises a set of data network nodes 3, 5, 7, which in this exemplary embodiment comprises a plurality of web servers 3, a router 5, and a switch 7. A data network node may in the context of this application be any hardware or software component, such as a device, connectable to a data network, including but not limited to web servers, radio base stations, switching devices, routers and gateways. The data network 1 may further comprise one or more services configurable within the data network, the one or more services including but not limited to a Virtual Private Network service (VPN), a Metro Ethernet service, an Internet Protocol Television (IPTV) service, a Voice over Internet Protocol service (VoIP), a Triple Play service (a packaged service including VoIP, IPTV and broadband), a broadband service, a mobile telephony service and a website service.

Installation and removal of network nodes, as well as creation, manipulation or deletion of services in the data network 1 require reconfiguration of the network nodes, meaning that configuration parameters of the respective network nodes have to be added, modified or deleted. To this end, a network monitoring system (NMS) 9, also referred to as a network management system, according to the invention is connected to the data network 1 for monitoring and/or reconfiguring the set of data network nodes 3, 5, 7 in the data network 1. Although the NMS system 9 in this exemplary embodiment is realized in form of a single NMS node, sometimes referred to as a network control system (NCS) server, it should be appreciated that the NMS system 9 could also be a distributed system including functionality residing in different nodes that are connectable to each other via the data network 1 or some other network.

Also shown in FIG. 1 is a piece of user equipment 11, such as a computer, which is connectable to the NMS system 9 to give a network operator the possibility to monitor and reconfigure the network nodes 3, 5, 7 of the data network 1 using the functionalities provided by the NMS system 9. The piece of user equipment 11 is arranged to the operator the possibility to monitor and/or reconfigure the data network or portions thereof by means of one or more interfaces and/or protocols including but not limited to a Command Line Interface CLI, a Graphical User Interface (GUI), such as a remote graphical user interface, a Network Configuration Protocol (NETCONF), such as the Internet Engineering Task Force (IETF) RFC 6241 network configuration protocol, a Simple Network Management Protocol (SNMP), such as the SNMP being part of the Internet Protocol Suite as defined by the Internet Engineering Task Force (IETF), a Multi-Technology Operations System Interface (MTOSI) or other suitable agent Application programming Interfaces (APIs).

With simultaneous reference made to FIG. 1, the NMS system 9 will now be described with reference to FIG. 2.

The NMS system 9 comprises a controller 13, also referred to as a network element driver (NED) that includes a processing unit 15, such as a microprocessor, and a digital storage medium or memory 17. The memory 17 stores a computer program which, when executed by the processing unit 15, causes the controller 13 to perform monitoring and/or reconfiguring data network nodes 3, 5, 7 in a data network 1.

The NMS system 9 comprises a server 50, such a backend server that includes a processing unit 51, such as a microprocessor, and a digital storage medium or memory 52. The memory 52 stores a computer program which, when executed by the processing unit 51, causes the server 50 to perform parts of the inventive method of monitoring and/or reconfiguring data network nodes 3, 5, 7 in a data network 1 with respect to services and devices, which method will be described in greater detail below.

The NMS system further comprises a network interface 19 for communication with the data network nodes 3, 5, 7 of the data network 1, and a user interface 21 for communication with user equipment 11 of a network operator 23. The network interface 19 is configured to transmit information, such as reconfiguration commands, to the network nodes 3, 5, 7 of the data network 1, and to receive information, such as configuration status reports, from the data network nodes. The user interface 21 is configured to transmit information, e.g. information on the current configuration of data network nodes, to user equipment 11 of a network operator 23, and to receive information from the user equipment 11 of the network operator 23, e.g. information on desired changes to the configuration of data network nodes, and commands instructing the NMS system 9 to implement the desired configuration changes in the data network 1.

In a preferred embodiment, the user equipment 11 is operated as a client or operating a client, such as operating a client computer program. The client is configured to communicate with the server 50 of the NMS system via the user interface 21. The user equipment 11 is also hosting a graphical user interface (GUI) generator configured to provide a graphical user interface for management/monitoring of the data network and/or associated services. Said graphical user interface (GUI) providing a graphical representation of the data network 1 and/or associated services based on information requested by the client, such as requested by an operator of the client, and received at the client from the server 50 upon said request from the client. In more detail the user equipment 11, includes a processing unit 53, such as a microprocessor, and a digital storage medium or memory 54. The memory 54 stores a client computer program which, when executed by the processing unit 53, causes the user equipment 11 to perform parts of the inventive method of monitoring and/or reconfiguring data network nodes 3, 5, 7 in a data network 1 with respect to services and devices, which method will be described in greater detail below.

In a preferred embodiment the GUI operated by the client is a web based GUI, such as a web based GUI provided in a web browser operated by the client.

The NMS system further comprises a first database 25 for storing information representing the current configuration of the data network nodes 3, 5, 7. This database is herein referred to as the Running database. The Running database 25 is synchronized with the network 1 so as to always reflect the current configuration of the network nodes 3, 5, 7. Synchronization of the Running database 25 may be performed automatically by the controller 13 of the NMS system. The NMS system is preferably configured to receive text-based configuration status reports, typically in form of CLI command sequences, from the network nodes 3, 5, 7 via the network interface 19, which configuration status reports are indicative of the current configuration of the network nodes 3, 5, 7. The controller 13 may be configured to update the Running database 25 automatically based on the received configuration status reports, so as to always keep the Running database 25 up to date. In other embodiments, synchronization of the Running database 25 with the current configuration of the data network 1 can be made manually by the network operator 23 by updating the Running database 25 via the user interface 21 whenever the configuration of a data network node 3, 5, 7 is changed. The Running database 25 may also be kept up to date by copying the content of a second database (not shown) into the Running database 25 after having implemented the desired configuration changes in the data network 1.

The NMS system 9 may thus further comprise a second database. This database is used for storing a desired future configuration of the data network nodes 3, 5, 7 and is herein referred to as the Candidate database. When changes in configuration of one or more data network nodes 3, 5, 7 are desired, i.e. addition, modification and/or deletion of one or more configuration parameters, the desired changes are not directly entered into the Running database 25 since the Running database 25 should always reflect the actual configuration of the data network nodes 3, 5, 7 running in the data network 1. Instead, desired changes in configuration of network nodes may be entered in the Candidate database. The desired configuration changes may be entered into the Candidate database either manually by network operators 23, or automatically or semi-automatically by means of software, such as computer programs tailored for operations support systems (OSS) or business support systems (BSS).

Furthermore, the NMS system 9 comprises a data model 29 of the data network 1, which data model models the data network nodes 3, 5, 7 of the network and their possible configurations. The data model 29 is preferably created in a modelling language conforming to a tree structure, such as an XML-like modelling language, wherein different leafs of the tree-structured data model define different configuration parameters of the data network nodes 3, 5, 7 of the data network 1. In a preferred embodiment, the data model 29 is modelled in YANG (RFC 6020), which is a data modeling language used to model configuration and state data manipulated by the NETCONF protocol. In this exemplary embodiment, the Running database 25 and the data model 29 are stored in a second digital storage medium or memory 31 of the NMS system 9. Of course, the various software components of the NMS system 9 could be stored in one or more storage mediums in one or more nodes of the NMS system 9. Also in case the NMS includes a candidate database, this candidate database may be stored in the second digital storage medium or memory 31 of the NMS system 9.

It should thus be appreciated that the data model 29 serves to describe the configuration data in the Running database 25 in the context of the data network 1 and its network nodes 3, 5, 7, whereas the Running database 25 only store data representing the current configuration parameters, respectively, of the data network nodes 3, 5, 7. In a similar fashion if the NMS system in addition to the Running database comprises a candidate database then the data model 29 serves to describe the configuration data in the Running and Candidate databases 25, 27 in the context of the data network 1 and its network nodes 3, 5, 7, whereas the Running database 25 and the Candidate database only store data representing the current and desired configuration parameters, respectively, of the data network nodes 3, 5, 7.

It should also be appreciated that the exemplary embodiment described with reference to FIG. 2 may be configured differently. For example more than one client providing a graphical representation of the data network 1 and/or associated services may be operated by one or more piece of user equipment 11. Thus more than one client may be arranged to communicate with the server 50 of the NMS system 9 in order to retrieve data from the data model 29 and the configuration database 25. Also more than one data model representative of the data network and/associated services or portions thereof may be stored in the second digital storage medium or memory 31 of the NMS system 9, said data models being accessible to said server 50.

It should also be noted that the client/user equipment 11 is configured to communicate with the memory unit 31 via the server 51 in order retrieve and store data from the memory unit 31 such as data related to the database 25 and/or the data model 29. In order to perform such communication the client/user equipment 11 may for example run actions via the server 51. Thus, the client/user equipment 11 is typically not configured to communicate directly with network equipment such as the controller 13 and the network element driver (NED), rather such type of communications are handled via abstractions layers such as middle layer abstractions.

Figure 3A:
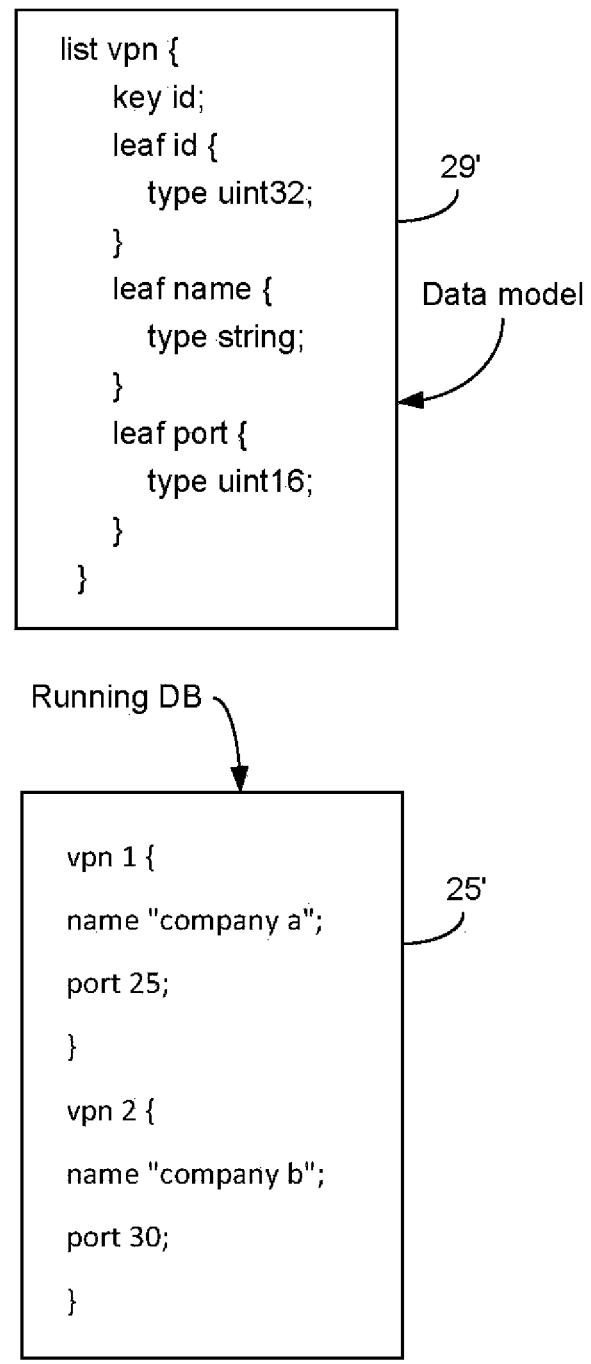
FIG. 3A illustrates examples of contents of a data model, a first database, of the network management system according to the invention.

As a way of illustration, FIG. 3A shows some exemplary code 29' of the data model 29, which exemplary code 29' defines the types of configuration parameters that can be assigned to a data network node of the data network 1 to define a VPN (Virtual Private Network) connection for that data network node. Also shown in FIG. 3 is an exemplary data set 25' stored in the Running database 25 and representing a current VPN configuration of a data network node in the data network 1.

The data 25' in the Running database 25 together with the data model 29 form a data structure representation of the current configurations of the data network nodes 3, 5, 7. In a corresponding manner in case the NMS system comprises a Candidate data base (not shown), data in the Candidate database together with the data model form a data structure representation of the desired configurations of the data network nodes 3, 5, 7.

The exemplary code 29' representing a data model, such as a YANG schema, of a VPN network is defined as a tree structure with associated structural elements and associated sub-elements in the form of leafs. In more detail the VPN network is defined by the exemplary code 29' of the data model 29 as structural element in the form of a list having a key identifying the particular list defining the particular VPN network of which the exemplary code 29' is a data model. Furthermore the list has three leafs in the form of an id for one or more VPN connections of the VPN network, a name for the one or more VPN connections and a port number associated with the one or more VPN connection. Each of the leafs have a data type associated to it. In more detail the id leaf has uint32 data type, the name leaf has a string data type and the port leaf has a uint16 data type associated with it.

The exemplified data 25' being the current configuration parameters associated to the VPN network as modeled by the exemplary code 29'. In more detail the exemplified data 25' defines that there are two VPN connections with identity 1 and 2, which are named "company a", "company b" respectively and which VPN connections are assigned port number 25 and 30 respectively.

Figure 3B:
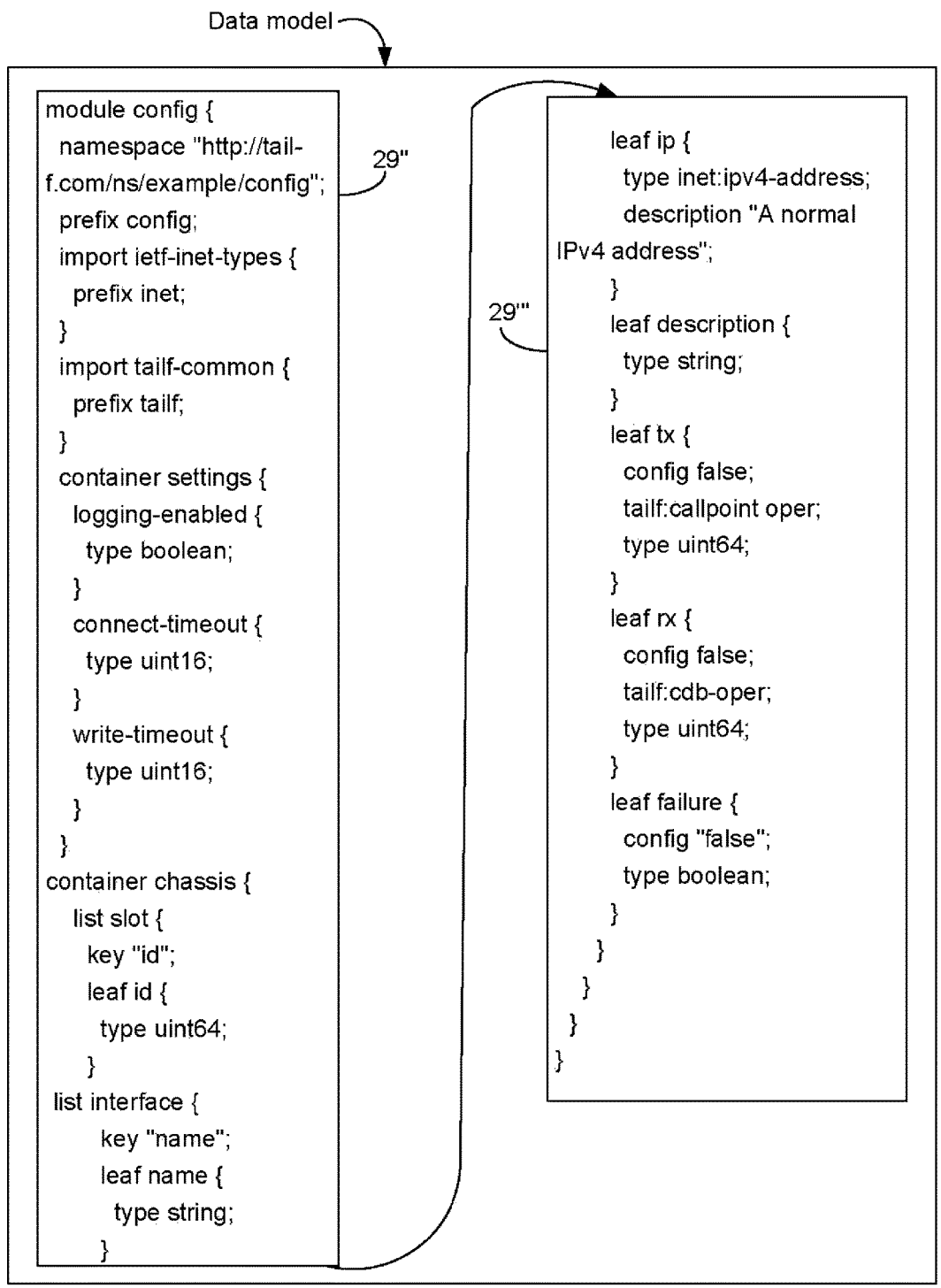
FIG. 3B illustrates examples of contents of a data model of the network management system according to the invention, FIG. 4A schematically illustrates a diagram of data flows and processing for providing a graphical user interface provided for monitoring/management of the data network, FIG. 4B schematically illustrates a more detailed diagram of data flows and processing for providing a graphical user interface provided for monitoring/management of the data network, FIG. 5A schematically illustrates a diagram of a model view controller pattern, FIG. 5B schematically illustrates a diagram of data processing involved in navigation within the graphical user interface, FIG. 6 schematically illustrates processes of a widget engine involved in selecting widgets for the graphical user interface.

As a way of illustration, FIG. 3B shows some exemplary code 29"-29''' (starting with code section 29' and continuing on with code section 29''') of the data model 29, which exemplary code 29"-29''' defines the types of configuration parameters that can be assigned to a data network node of the data network 1 to define a module of the data network with associated one or more chassis with one or more interfaces, such as one or more network interface card. The data model 29 may represent any form of chassis together with hardware devices pluggable into one or more slots of the chassis. The chassis may further have at least one dedicated controller for communication with the hardware devices of the chassis, wherein said at least one dedicated controller also may be represented by said data model 29. The hardware devices of the chassis may comprise circuit cards and/or computers, such as devices having at least one central processing unit (CPU) and an operating system (OS). Example of hardware devices that may pluggable into the chassis is a server running Linux OS and/or a slimmed hardware device running for example a real-time operating system (RTOS). The slots of the chassis typically comprise interfaces, such as network interface cards (NIC). Preferably the data model 29 is configured to represent chassis together with network units or network elements such as routers, switches web servers or other associated equipment suitable in a network environment context of interest to manage using the graphical user interface of the present invention.

The principal parts of the exemplary code 29"-29''' comprises a structural element in the form of a module having settings and chassis grouped in two structural elements in the form of containers or in more detail the for the settings for module are grouped in a settings container and the chassis of the module are grouped in a chassis container. The settings container includes three different settings or configurable properties in the form of a logging-enabled setting, a write-time out setting and a connect time-out setting, Each of said setting have a data type associated to it in the form of a Boolean data type and two uint16 data types respectively. The chassis container is linked in the tree structure to a structural element in the form of a list defining slots associated to the chassis. The slot list is in turn linked in the tree structure to a structural element in the form of a list defining the settings of interfaces associated to the slots of the chassis. The list of configurable properties for the interfaces of the slots includes a number of leafs defining the different configurable properties, such as an ip address etc.

Accordingly, the above described data model describes a module with configurable settings and a configurable number of chassis with associated interfaces, which interfaces have a number of configurable properties related to for example an ip address, and transmit/receive (Tx/Rx) packet properties.

The actual configuration of the above described module, such as the number/identity of one or more chassis included in the module and the number interfaces of the chassis, may be defined in a configuration data base, such as the configuration data base 29, associated to the data model.

In a similar fashion as is shown in FIG. 3A the exemplary code 29"-29''' may be complemented with associated configuration data (not shown) defining configuration parameters associated the above mentioned module.

It is to be appreciated that the exemplary code shown with reference to FIG. 3A and 3B is only simple examples of parts of an entire configuration data network 1. Accordingly, a data model of an entire data network with associated services may comprise many YANG schemas with more code rows. Also additional data types and/or structural elements/ sub-elements other than the exemplified data types and/or structural elements/sub-elements with reference to FIG. 3A and FIG. 3B may be included in the YANG schemas.

The information relating to the structural elements, the associated sub-elements, the associated data types and the configuration data described with reference to FIG. 3A and/or FIG. 3B will be used in the process of automatically rendering a customizable graphical user interface for monitoring and/or managing the data network 1, which process will be explained in more detail below.

Figure 4A:
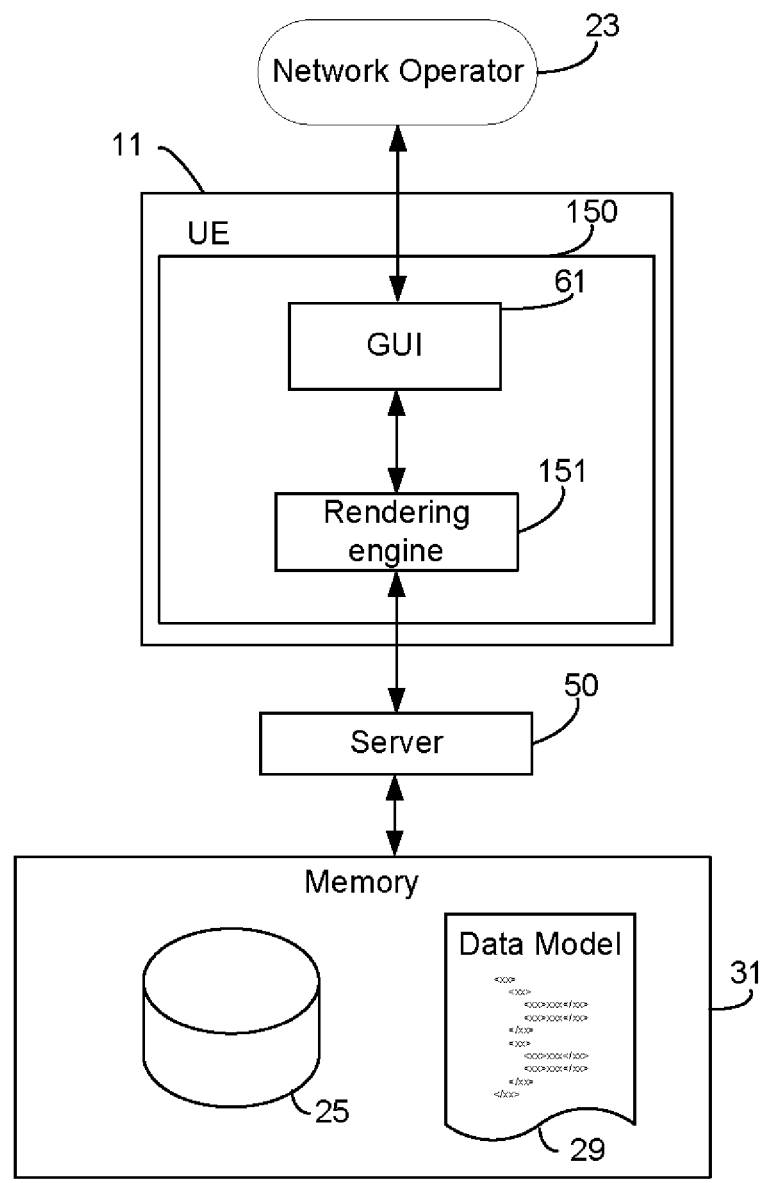

FIG. 4A illustrates schematically a block diagram of data flows and data processing data associated with generating a graphical user interface for management/monitoring of the data network 1 according to an embodiment of the present invention. The graphical user interface (GUI) 61 is operated in a client environment provided by the user equipment 11, coupled to the server of the NMS system 9 as exemplified with reference to FIG. 1 and FIG. 2.

Figure 2:
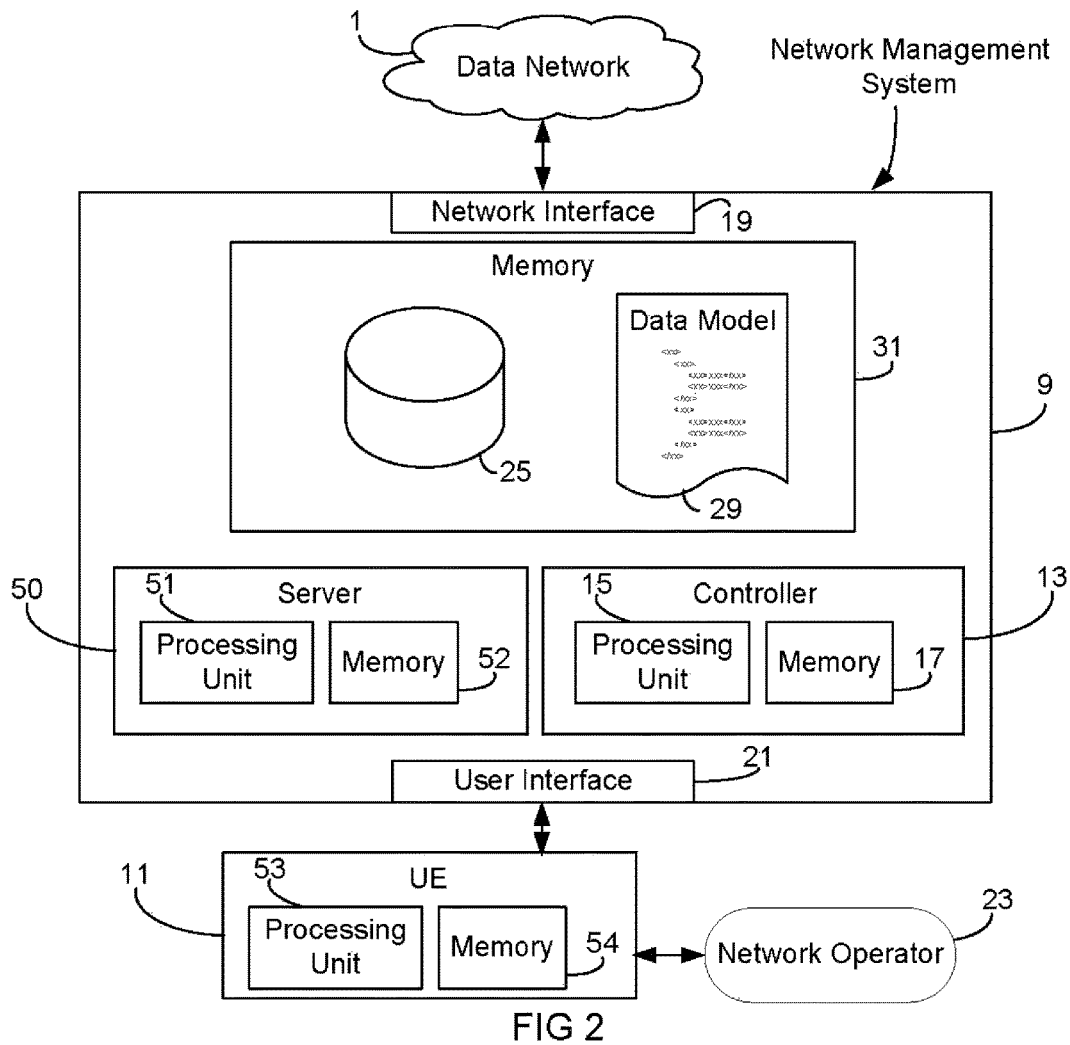
FIG. 2 illustrates the network management system of FIG. 1 in greater detail.

With reference to FIG. 4A a user equipment 11, such as the user equipment illustrated with reference to any of FIG. 1 or FIG. 2, is configured to operate a client 150, such as a client application. The client application may comprise machine readable instructions storable on a memory unit of the user equipment 11, such as storable on the memory unit 54 as exemplified with reference to FIG. 2. The client application further being configured for orchestration by a processing unit of the user equipment, such as by the processing unit 51 of the user equipment as illustrated with reference to FIG. 2.

The client 150 comprises a rendering engine 151, such as a software based rendering engine, which when executed by the processing unit, such as the processing unit 51 of the user equipment 11 exemplified with reference to FIG. 2, causes the client to perform rendering of a graphical user interface 61 to be presented to a network operator 23. The graphical user interface 61 allows for the network operator to monitor and manage a data network via a network management system, such a data network 1 with the associated network management system 9 as exemplified with reference to FIG. 2. In more detail the graphical user interface is configured to present a graphical representation of the data network 1, such as a graphical representation of a portion of the data network of interest for the network operator 23 to view.

The rendering engine 151 of the client 150 is configured to retrieve information from a data model 29 representing a current configuration of the data network 1 with associated configured services. Said data model 29 being for example a YANG data model comprising a number of YANG schemas each having a number of structural elements and sub-element, wherein each of said structural elements and sub-elements having a data type of a set of data types associated to it.

In order to retrieve data from the data model 29, the rendering engine is configured to generate a request for retrieving information from a location on which the data model is stored. The request may thus be generated by the rendering engine and subsequently be forwarded from the rendering engine to a server having access to said data model 29, such as to the server 50 of the network management system 9 exemplified with reference to FIG. 2. The request is generated based on a user input provided by means of the network operator interacting with the graphical user interface so as to provide an indication relating to which portion of the data network that is of interest of the network operator for display in the graphical user interface. Said user input being configured to be received by the rendering engine by means of being inputted by the user via suitable input means associated to the graphical user interface and/or the user equipment and subsequently forwarded from the input means to the rendering engine.

Upon retrieving information from the data model the rendering engine is configured to analyze the received data and transform the received data into graphical representations. In more detail the rendering engine is configured to select a graphical representation to represent each of the structural elements and sub-elements associated to the data from the data model retrieved via the above mentioned request. The graphical representations are selected by the rendering engine from a plurality of widgets of at least one widget library, such as at least one widget library exemplified in more detail with reference to FIG. 6, accessible to said rendering engine, such as accessible by means of being configured to be stored on the memory unit 51 of the user equipment 11. The rendering engine may also configure attributes of said widgets so as to properly reflect said structural element and sub-elements.

In order to select graphical representation the rendering engine utilizes registry data accessible to the rendering engine, such as accessible by means of being configured to be stored on the memory unit 51 of the user equipment 11. Said registry data define pairings between structural element/sub elements of the data from the data model and graphical representations or properties thereof. The registry data may for example defined key value entries also referred to as key registration entries. The key defining the context in the data model for which a value or registration is be associated. The value or registration defines the graphical representation or properties thereof to be associated to the context in the data model as defined by the associated key. The key may as an example point to a name of data type associated to one or more structural elements of the data model and the value or registration may define an alternative name or a widget of the widget library. Thus by using the information provided within the registry data the rendering engine can select a graphical representation and configure said graphical representation to reflect the structural element/sub-element of the data model. The registry data may for example be configured in a similar fashion to the registry data exemplified with reference to for example any of FIG. 4B or FIG. 6.

According to an embodiment the registry data comprises default registry data and customization registry data. In this example the rendering engine first checks for each of the structural element and sub-element of the received data from the data model to see if there are entries in the customization registry data and selects and configures a graphical representation as defined by the customization registry data and if there is no such customization registry data the rendering engine instead selects and configures the graphical representation as defined by the default registry data. This allows providing customized graphical user interface for different network operators for facilitated operations. The default registry data and the customization registry data are preferably merged into a single registry so that registry searches can be performed in a single registry. In more detail the default registry data and the customization registry data are merged in the order in which the customizations associated to the customization registry data are loaded, such as loaded into the memory unit 51 of the user equipment 11, so as to form a new registry separate from the default registry containing default registry data and the customization registry containing customization registry data. This merging process is preferably performed when the client is started. As mentioned above in case of default registry data conflicting with customization registry data then the customization registry data overrides matching default registry data. Also in case certain customization registry data conflicting other customization registry data then the latest entered/loaded customization registry data overrides previously entered/loaded matching customization registry data.

Figure 6:
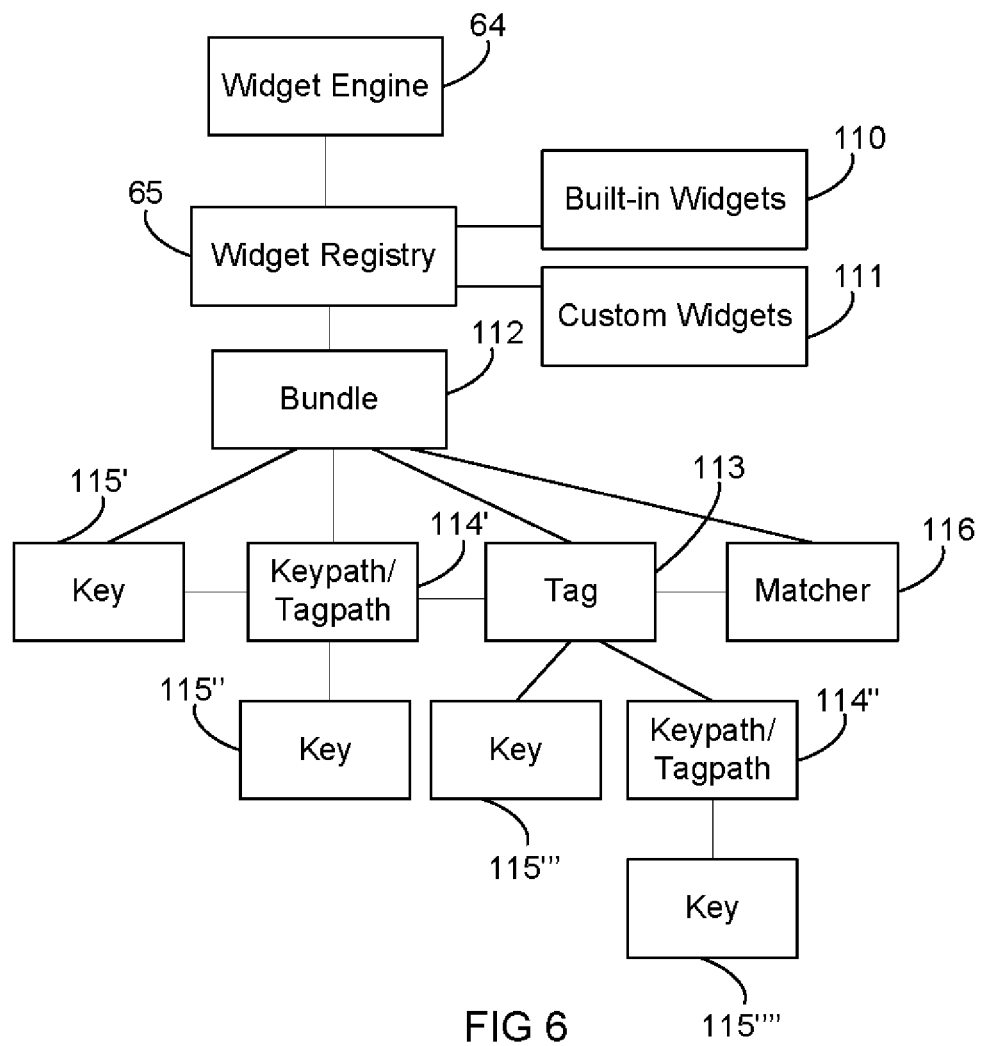

The pairings of the customized registry data may also be combined with for example different types of search paths or resource identifiers, such as exemplified with reference to FIG. 6, so as to target one or more unique elements of the data model. Also the customization registry data may define values or registrations which relates to configuration aspects of said graphical representation, such as for example life cycle handling, translation of labels/arguments and contextual settings such as widget attributes.

The rendering engine 151 of the client 150 may also be configured to retrieve information from a data base 25 associated to the above mentioned data model 29. The data from data base defining configurable parameters associated to the data model. The data from the data model may also be used by the rendering engine so as to provide graphical representation properly reflecting said structural elements and sub-elements i.e. so as to properly reflect the current configuration of the data network.

After having selected the graphical representations to represent the structural elements and sub-elements of the received data from the data model as indicated by the user input, the rendering engine is configured to render the selected graphical representations. When rendering the selected graphical representations the rendering engine may also use information relating to the parameters retrieved from the data base 25. In more detail the parameters of the data base 25 may be used by the rendering engine 151 for example in setting information for one or more of the graphical representations associated to each structural element and sub-element with respect to for example number of instances, identity of instances, name of instances and other configurable properties of instances such as port numbers, ip addresses etc. This type of information provided by the configuration data base is for example exemplified with reference to FIG. 3A.

Figure 4B:
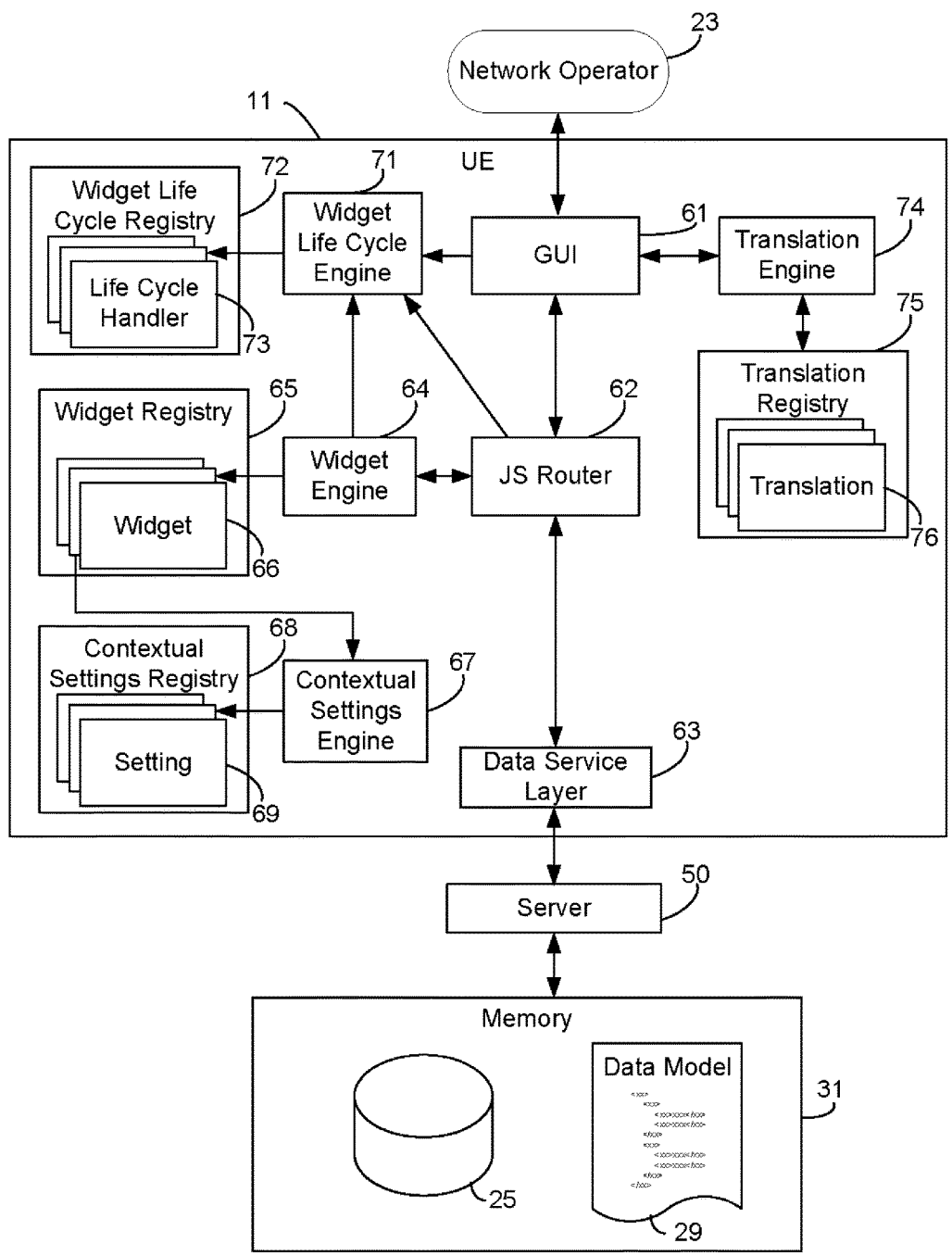

FIG. 4B illustrates schematically a block diagram of data flows and data processing data associated with generating a graphical user interface for management/monitoring of the data network 1 according to an embodiment of the present invention. The graphical user interface (GUI) 61 is operated in a client environment provided by the user equipment 11, coupled to the server of the NMS system 9 as exemplified with reference to FIG. 1 and FIG. 2.

The graphical user interface 61 is rendered instantaneously based on information from the data model 29, such as from the YANG data model, and other associated data from database 25 stored in the NMS system 9. The basics of the rendering process relate to the process of in the data model or a selected portion thereof, being representative of a model of a selected portion of the data network 1 and/or services associated thereto, identifying one or more data types of one or more particular leaf or structural elements, such as a list, leaf-list, action, module or container, and then selecting one or more predefined widget registered for this particular structural element or leaf to graphically represent it.

The graphical user interface 61 as shown with reference to FIG. 4B is exemplified as a web based graphical user interface, meaning that the graphical user interface is provided in a web browser. The web browser being orchestrated by said user equipment 11 by means of said processing unit 53 the digital storage medium or memory 54, wherein a programme code, for causing the web browser to be executed by the processing unit 53, is stored on the digital storage medium or memory 54. This also means that the graphical user interface is operated remotely from the NMS system 9. The web browser may for example be configured to download and store a client computer programme upon logon onto the server of the NMS system 9. Said client computer programme causing the web browser to display said graphical user interface 61. The process of providing the graphical user interface 61 allowing a network operator to monitor/manage the data network and/associated services is explained in more detail below.

It is to be appreciated that the graphical user interface 61 with reference to FIG. 4B may be provided differently than as exemplified with reference to FIG. 4B. For example the client programme providing the graphical user interface may be hosted and orchestrated as a dedicated client software application within said user equipment i.e. be orchestrated without a requiring a web browser.

In more detail the graphical user interface 61 is configured to present at least one user input dialog to a user of the graphical user interface, said at least one user input dialog providing the user with a selection for selecting one or more portion of the data network 1 and/or associated services that is of interest to view in the graphical user interface. The selection may for example be presented as a list, menu or other suitable selection component, which presents a number of devices, services present within the data network 1.

When a user, such as a network operator 23, of the user equipment 11 interacts with the graphical user interface via any form of suitable input means, such as for example a mouse, keyboard, touch screen, in order to navigate or otherwise open a selection of one or more portion of the data network, as is represented by the data model, to monitor and/or manage, a navigational trigger is generated, for example by informing a web browser to follow a specific HTTP link. The navigational trigger is sent to a routing mechanism of the graphical user interface, for example the JS router 62. Such a routing mechanism is often called a router and the said navigational triggering is often referred as triggering a route. Such a client side router provides methods for routing client side pages and connecting them to actions and events. Said router may for example be a script, such as router being part of the Javascript backbone.js lightweight library. The principal function of the JS router is to load a graphical user interface model and choose a widget to represent it and also handling user navigation within said graphical user interface. The above mentioned generated trigger causes the JS router 62 to generate a request for loading the portions of the data model and associated data corresponding to the selection made by the user. The generated request is transmitted via a data service 63 layer to the server 50 of the NMS system 9. The data service layer 63 is responsible for handling information transfer between the JS router and the server i.e. manages calls to the server 50 and information received in response to the calls to the server 50. Upon receiving the request from the JS router 62 via the data service layer 63 the server 50 accesses the data model 29 and the associated configuration data in the data base 25 so as to retrieve the requested information corresponding to the selection and then proceeds by sending the retrieved information back to the JS router 62 via the data service layer 63. Accordingly, the information received at the data service layer 63 sent from the server includes one or more particular structural elements, being portions of the data model, such as portions of one or more tree structured YANG schemas exemplified with reference to any of FIG. 3A or FIG. 3B, together with associated data from the configuration data base 25. The information received at the data service layer 63 sent from the server 50 may also include information relating to sub elements of the one or more particular elements, such as all elements it contains, such as all element the one or more particular structural elements contain one or more levels down in the tree structure of the one or more YANG schemas. Said one or more particular structural elements being selectively taken from the data model 29 according to the selection made by the user and since the data model reflects the data network 1 and/or associated services said one or more structural elements reflect the one or more portion of the data network and/or associated services selected by the user.

Upon receiving the requested data model, such as the YANG schemas or portions thereof, and associated data at the JS router 62, a process is initiated by the data service layer 63 which analyzes the received schema information and transform each of the structural element, such as each of the structural elements of the YANG schemas or portions thereof, into one or more graphical user interface models, one for each structural element. In more detail the one or more graphical user interface models are self-contained representations of the corresponding portions of the data model 29, such as the YANG data models or schemas. The graphical user interface models contain metadata that identifies the corresponding YANG model element, such as structural element or leaf; they encapsulate access to raw properties and provide hints for rendering a user interface. Properties of the graphical user interface model including but not limited to a keypath and members properties. The keypath identifies the corresponding YANG model element. The members property is an array of all children to the graphical user interface model. The members property is only present in graphical user interface models that represent a collection of other graphical user interface models. For example, the members property is not present in a graphical user interface model of a leaf. The graphical user interface models differ from a YANG data model or schema, in that the purpose of the graphical user interface models is to render a user interface. The models, by way of their metadata and by way of their type, carry the information necessary to match them with widgets and thereby render a user interface. The graphical user interface model tree can therefore be totally different from that of the YANG model.

As stated above each resulting one or more graphical user interface models, is a self contained entity that is independent of the other graphical user interface models. Each of the one or more graphical user interface models is also context aware and can communicate with the server 50 if needed. As previously described, each of the one or more graphical user interface models is self-contained. A practical example of this is when data is changed in a graphical user interface model. When this occurs, the model itself is capable of sending the changed data to the server through the data service layer 63. The model has all the information necessary to do that. This means that it is very easy to display data from disparate parts of the data model, such as the YANG data model,—side-by-side—in the graphical user interface with minimal customization effort. In other words instead of building a custom widget to be used for representing certain data from one or more parts of the data model in a graphical user interface as traditionally graphical user interface models associated to a number of different parts of the data model is used as basis for auto rendering the graphical user interface operated by the client. This is accomplished by means of that each graphical user interface model is self-contained. This is explained in more detail below. As an example it is possible to provide registrations associated to the JS router causing the JS router to load a number of parts of the data model and assemble these parts into one or more graphical user interface model in response to a user of the graphical user interface clicking on a certain link i.e. URL of the graphical user interface model. The result, i.e. the assembled one or more graphical user interface models may then be auto rendered i.e. rendered automatically. The auto rendered page corresponding to the URL to which the user has navigated and the one or more widgets associated to the one or more assembled graphical user interface models may then be subjected to customizations so as to enable presenting data from the data model in a customized fashion as desired by one or more particular operator of the data network and/or services associated to the data network. This means that on a high level the operations, of the client configured to provide the graphical user interface, involves: loading a number of graphical user interface models associated to the data model; discarding one or more loaded graphical user interface associated to parts of the data model not desired for viewing in a particular page representation of the graphical user interface, i.e. a certain URL page; assembling the remaining graphical user interface models into a tree structure to cater for logic presentation and auto render the assembled graphical user interface models and finally perform customizations of the auto rendered graphical user interface page, such as performing customizations of at least parts of the auto rendered graphical user interface page. The traditional option associated to graphical user interfaces for network management according to prior art is to provide entirely custom pages or widgets which is a vastly time consuming process, especially since the data model is updated quite frequently in order to reflect changes in the data network which means that the graphical user interface is in need of frequent reprogramming. Thus, implementing a graphical interface according to the invention vastly facilitates to provide a customized graphical user interface which with minimal or no efforts reflects changes made to the network and which graphical user interface is tailored for a particular network operator.

Because the one or more graphical user interface models are self-contained it is possible to load data from different parts of the data model, such as the YANG model, and create the graphical user interface simply by assembling the models into a coherent whole. Graphical user interface models put together in this way, can then be given to the a widget engine, which then is configured to select one or more appropriate widgets to render the graphical user interface models. How much of the rendering is done automatically or customized can be controlled easily. After data models have been retrieved and assembled as described, the JS router 62 requests from the Widget engine a widget for rendering the given data model. The JS router 62 preferably at minimum provides a key that identifies a widget and a bundle that identifies where to look for the key. Since the data model is a tree structure with a single root node, the router can analyze the model in order to decide which key and which bundle to use. For example, the router can use the YANG schema name of the structural element as a key while the bundle name used is a fixed one, based on the virtue of the route that was triggered, i.e. certain routes always use a certain bundle name by default. One or more view tag and/or keypaths may be retrieved from the navigation trigger the user triggered. The navigation trigger thus contains information on which JS route 62 to trigger, the view angle/view tag pertaining to the navigation trigger and finally what portions of the data model to load. This will lead to the Widget engine selecting a widget that is as best a match to all these parameters as possible, resulting in an automatically rendered user interface. If only built-in widgets are chosen, no further customization is needed. However, the user interface generated in this way can be completely customized, for example by registering a custom widget that matches the input parameters to the widget engine, or only portions of it, by registering widgets for rendering portions of the sub-data model provided. Further, it is possible to override the default bundle parameter as well as provide an alternative widget key, by pre-registering these parameters to a specific named route. When this specific named route, or navigational trigger, is triggered, the pre-registered key and/or bundle parameters are used instead of the ones that the router would otherwise use. It is also possible to pre-register a named route that contains, in addition to the key/tag/bundle combination, one or more keypaths that should be loaded. It is also possible to pre-register a named route that contains, in addition to the key/tag/bundle combination, a configuration that instructs the router what portions of the data model to load and how these should be assembled into a single coherent whole, for rendering in the graphical user interface. The graphical user interface contains three types of JS routers 62. One type is configured for loading a portion of the data model at a specific keypath and rendering it. One type is configured for providing a shortcut into a part of the data model, as if it were an independent data model and one type is configured for loading one or more specific portions of one or more different data models and selecting a widget for rendering it, either automatically using default settings or those settings provided when a route is registered. The functions of the widget engine 64 will be described in more detail below. Also more details with regard to keys, tagpaths, keypaths and bundles will be described with reference to for example FIG. 6.

In more detail once the one or more graphical user interface models have been created by the above described transformation process, they may be further processed by a grouping function. The grouping function processes the one or more graphical user interface models by analyzing the corresponding structural elements and sub elements associated to said structural elements so as to regroup the sub elements in order for them to be rendered as field sets, i.e. a grouping with a title. This process may be applied both for structural element having sub elements such as containers and for lists having sub elements. The result of the processing by the grouping function is a model structure for the one or more graphical user interface models with a single root model, i.e. forms a tree with a single root level, which facilitates rendering of the graphical user interface models in the graphical user interface provided by the user equipment 11 and provides for a more user friendly presentation.

The one or more graphical user interface models are subsequently sent from the data service layer 63 to the JS router 62. In case the grouping process is applied the model structure is also sent to the JS router. The JS router then sends said one or more graphical user interface models or the one or more graphical user interface model in combination with said model structure for said one or more graphical user interface models to the widget engine 64 for selection of one or more widget to render the one or more graphical user models. In more details the widget engine 64 is configured to use certain parameters as input. These parameters are provided as a data structure containing properties. By design, the graphical user interface models contain such matching properties. The JS router is configured to select and provide the key and the bundle parameters. The key can be retrieved from the graphical user interface model by means of analyzing the graphical user interface model, how is up to the router, or by means of using some sort of interception, such as for example by checking one or more customization registration. The bundle is provided by the JS router by virtue of the router itself, such as by means of using a default value/parameter, or, by means of using a process similar to the above described process for retrieving the key, i.e. by means of some sort of interception or pre-registration. In other words, the JS router analyzes the top-level graphical user interface model and picks from that analysis the parameters to be used as input to the widget engine.

With respect to selecting a widget the widget engine 64 is upon receiving the one or more graphical user interface model from the JS router responsible for selecting at least one widget 66 from at least one widget library that will render the at least one graphical user interface model. In more detail the widget engine uses a widget registry 65, configured to define mappings or links between data types of the data model 29 in order to select the one or more widget to handle rendering. In more detail the widget registry 65 maps widgets 66 to data types of the structural elements and/or data types of leafs of the data model, such as the above mentioned YANG schemas. Since each of the one or more graphical user interface models have a structural element or leaf associated to it, as explained above, the widget engine can select at least one widget to render based on the information included in the widget registry defining links between data types associated to structural element and/or leafs and the one or more widget of the widget library. This also means that the process of transforming information in the data model 29 and the configuration data base 25 of the NMS system into the graphical user interface representation for monitoring/management purposes can be automated and held consistent with the current configuration of the data network and/or associated services as reflected by the data model 29 and the configuration data base 25.

As an example of how selection takes place in the widget engine, the widget library may comprise a text box widget and the widget registry may be configured to associate all string data types of all structural elements and/or leafs of the data model to this text box widget. This means that when the user selects a portion of the data network and/or the associated services and when the portion of the data model 29 with associated configuration data from the data base 25 corresponding to the user selection is retrieved from the server of the NMS system 9, the graphical user interface models being associated to structural elements and/or leafs having defined a string as a data type will be rendered in the graphical user interface as text boxes with data from the data base 25 populating for example the text field of the text boxes and defining the number of instances of certain structural elements provided within for example lists.

After the widget has been selected by the widget engine the widget is then instantiated. The widget instance receives the model and other necessary properties.

In more detail with regard to the rendering process, once a widget 66 for each of the one or more graphical user interface models and/or the single root model has been returned to the JS router, it is rendered off-screen, such as rendered by a rendering engine of the JS router. Rendering is an asynchronous, non-blocking process. When a widget is going to render itself it requests a HTML template engine to provide it with a specific HTML template. The HTML template engine loads the HTML template, compiles it, caches it internally and returns the compiled template. Mode details of the HMTL template engine are explained with reference to any of FIG. 5A or FIG. 6. The widget executes the compiled template and provides it with the model and other data necessary. The resulting HTML code is rendered off screen. If the graphical user interface model contains children, the widget may render these as well. Just like the JS router, it requests widgets for each graphical user interface model from the widget engine and informs the widgets to render. Once all the widgets have rendered they are flashed instantaneously onto the graphical user interface of the user equipment 11, such as within the web browser orchestrated by the user equipment 11.

The at least one widget library may comprise a default widget library also referred to as built-in widget library and a custom widget library. The one or more widget libraries are explained in more detail with reference to FIG. 6.

In case the both the default widget library and the custom widget library is implemented in the client programme of the user equipment 11, then widget engine 64 first checks is there is a custom widget registered for the structural element associated to the graphical user interface model in the widget registry 65 and if there is no custom widget registered in the widget registry for handling rendering of the particular graphical user interface model one or more of the built in widgets as defined by the widget registry 65 are selected by the widget engine to handle the rendering of the particular graphical user interface model.

According to an example relating to if a particular graphical user interface model represents a data element, such as an IP address, whose type is derived (extends) from another type (which in turn may be derived from another type etc.), the widget engine 64 may be configured to run through a type stack of the particular graphical user interface model's type until the widget engine 64 finds a matching widget to return based on entries in the widget registry 65.

According to yet another example the client programme of the user equipment 11 may comprise a contextual settings engine 67. The contextual settings engine 67 is configured for communicating with the widget registry 65 allowing entries of the widget registry to point to a certain setting 69, i.e. a contextual setting, via the contextual settings engine 67. This allows for defining different attributes to be assigned to at least one of the one or more widget of the widgets registered in the widget registry. After the widget engine has selected a certain widget and upon detecting that this certain widget has a setting associated to it, a request for selection/retrieval of the particular setting is triggered to the contextual settings engine so as to allow for the contextual settings engine to properly configure said particular setting for said particular widget. In more detail the contextual settings engine 67 selects the particular setting for the particular widget based on registrations, i.e. settings 69, of a contextual setting registry 68.

As an example in case the widget selected by the widget engine for one or more of the graphical user interface models is a list widget, the contextual settings may the attributes determining the configuration of the list widget, such as for example the number of columns to be included in the list widget and/which information, i.e. data from the data model 29 and/or data base 25 to include in which of the columns.

It should be appreciated that the contextual settings engine apart from affecting one or more setting of one or more widgets registered in the widget registry also may be configured to affect one or more setting of one of more graphical user interface model.

According to an example a widget life cycle engine 71 having access to a widget life cycle registry 72, is provided within the client application of the user equipment 11. The widget life cycle engine 71 is configured to manage customizations associated to the life cycle of components, i.e. widgets, provided within the graphical user interface. A widget typically triggers a number of events during its lifetime such as for example on BeforeCreate, on Created, on Rendered, OnDestroyed, etc. Thus, by means of registering one or more life cycle handlers 73, in the widget life cycle register, configured to cause modifications, i.e. customizations, of one or more widget in response to one or more life cycle event, customizations such as decorating customizations can be provided. The widget life cycle engine is configured for communication with the widget life cycle registry 72, the JS router 62, the widget engine 65 and the graphical user interface 61 in order to retrieve information, such as information about widgets, for handling customization associated to life cycle events of the components, i.e. widgets, of the graphical user interface. A particular life cycle handler registration may as an example associate a life cycle event in the form of an on BeforeCreate life cycle event of a particular widget with one or more customized initiation parameters of the particular widget and/or with a HTML snippet to be injected into the particular widget. Thus, by providing widget life cycle event listening in the widget life cycle engine the widget life cycle can cater for providing customizations of one or more widgets, in response to life cycle events triggered during the life time of the one or more widgets, based on the registrations of the widget life cycle registry.

According to yet another example the client programme of the user equipment 11 may comprise translation engine 74. The translation engine 74 is part of the flexible customization features of the present invention which will be explained in more detail with reference to FIG. 6. The translation in is configured for communication with a translation registry 75, defining graphical user interface models or in more detail defining structural elements and/or leafs of the data model 29 that are to be subject to some form of translation. The translation engine is configured to enable translating one or more portions of the graphical user interface into different languages. It is also possible to redefine the whole or parts of a default or built-in language and provide alternate textual representations for YANG model elements, such as leaf and container names or labels thereof. For example if certain parts of the data model or associated widgets representing the data model are defined in English, these parts or portions thereof may be translated into German or French. Further, in case a particular network operator desire to have a text saying "Type your user name here" in their graphical user interface a translation could be added to the translation registry defining that the label "Login" of the data model 29 and/or associated configuration data 25 instead should be displayed as "Type your user name here" in the graphical user interface. Furthermore, translatable text may be associated with structural elements and/or leafs of the data models, for example a widget used for rendering said structural element and/or leaf may contain additional text related to the graphical user interface, such as a tooltip. The widget can then check if a suitable translation exists for said text associated with the said structural element and/or leaf of the data model. The translation engine can also translate text not necessarily associated with a portion of a data model.

The above mentioned graphical user interface, the JS router, the data service layer, the widget engine, the widget registry, the contextual settings engine, the contextual settings registry, the life cycle engine, the life cycle registry, the translation engine and the translation registry resides in the client environment, such as within the client application 150 exemplified with reference to FIG. 4A, while the server 50 is located in the NMS system 9. Thus, all of the above mentioned components mentioned as hosted by the client is orchestrated and/or managed by the user equipment 11.

Figure 5A:
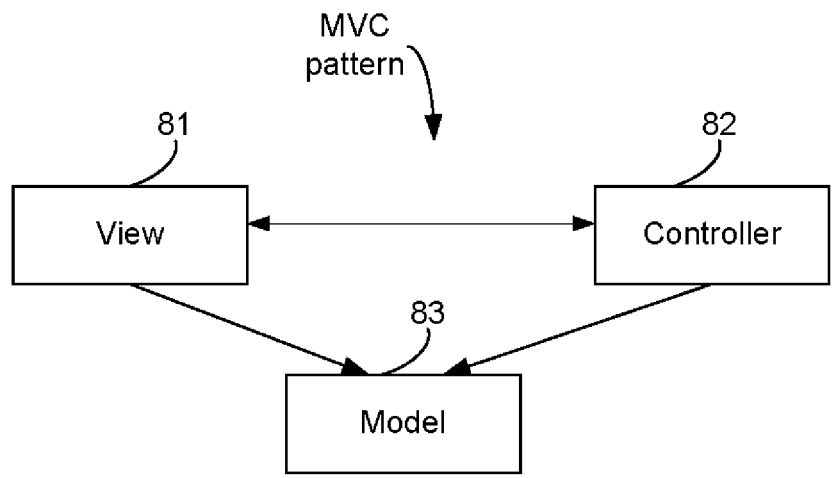

FIG. 5A illustrates an overview of a model view controller pattern.

In a Model View Controller (MVC) pattern a controller 82 is responsible for loading a data model 83 and forwarding it to the view 81. The view 81 displays the data model 83. The controller 82 responds to events in the view 81, manipulating the data model 83, and persists it, if need be.

According to an example of the present invention the graphical user interface can be seen as operating in a MVC pattern. The view 81 of the MVC pattern corresponds to an HTML snippet or template, such as a HTML template exemplified with reference to FIG. 5A, of the graphical user interface of the present invention. The HTML template renders the one or more graphical user interface models, such as the one or more graphical user interface models exemplified with reference to FIG. 4B. The controller 81 of the MVC pattern, may be seen in the graphical user interface of the present invention as corresponding to a script object, such as a Javascript object that inherits from a Backbone.View. A backbone.js router, such as the JS router exemplified with reference to FIG. 4B could also be viewed as a controller, since its purpose is to load a data model and choose a widget to display the model. The controller 81 of the present invention also hooks into Document Object Model (DOM) Events in the HTML template. However, when looking at a widget and the one or more user interface models it renders, these three components—HTML Template, Javascript widget and graphical user interface model—they meet the criteria for an MVC pattern.

The MVC pattern makes the graphical user interface of the present invention modular and extensible. Changes as to how a model is rendered can be achieved simply by changing which HTML template should render it. It is also possible to change the behavior of a widget, simply by extending the widget, such as a Javascript widget, and overriding and/or adding certain methods.

Figure 5B:
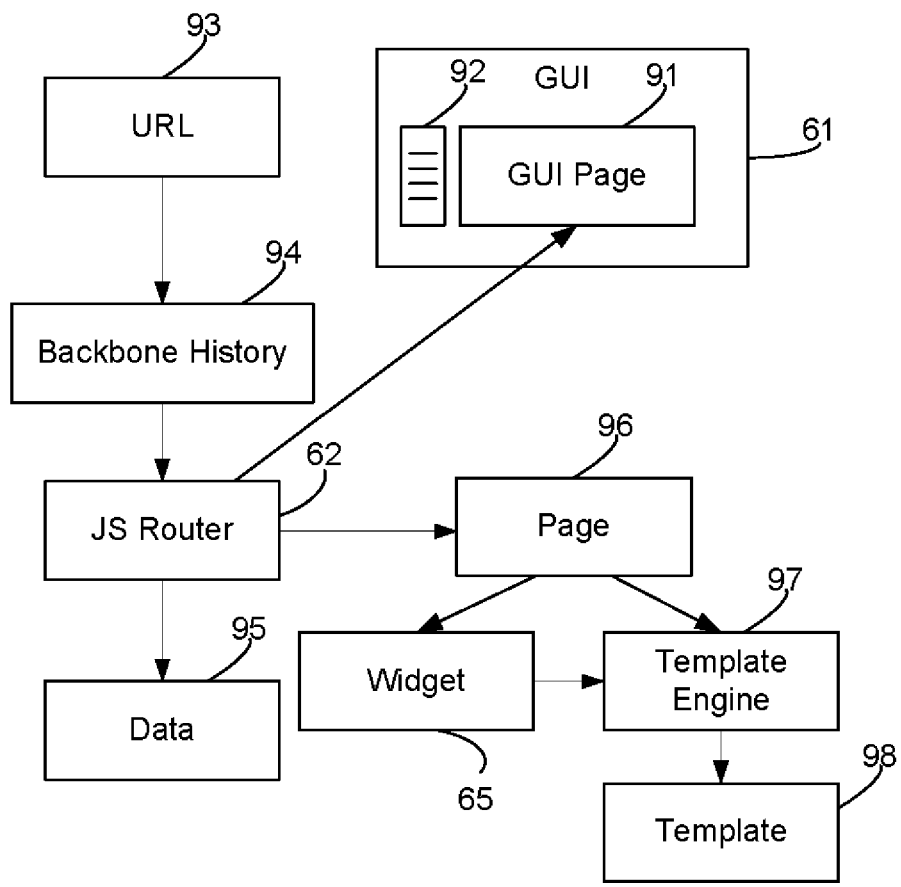

FIG. 5B illustrates an overview of the process of handling navigation in the graphical user interface.

As shown in FIG. 5B, a web based graphical user interface 61 according to the present invention is shown. In more detail the process of rendering the graphical user interface and managing updating the graphical user interface as a result of user interacting with the graphical user interface is shown. The user interacts with the graphical user interface via any suitable user input means, such as via a interacting with a menu 92 provided with the graphical user interface 61. In more detail when a user logs onto the graphical user interface by means of the client application, the user is presented with a start page having a left side list menu enabling selection which part of the data network and/or associated services is of interest for the user to monitor/manage.

Navigation in the graphical user interface is according to an example accomplished by means of URL page style navigation as typically found within web browsers. In more detail navigation in the graphical user interface controlled using routes. There are two parts to a route: a routing table and a router in the form of a Javascript router such as a router from backbone.js lightweight library. The routing table maps a URL pattern 93 to a function. The JS Router is an object that encapsulates the routing table and the routing functions. When a URL link is clicked, the router selects an appropriate handler to handle the navigation. This is called selecting a route. The route, loads data 95, such as data 95 from the configuration data base 25 and the data model 29, from the server 50 and selects a widget to render that data.

As an example of a configuration of the JS router, the JS router may be configured as a module router. The module router is configured to load portions of data model 29 and associated configuration data of the data base 25 from the server 50 of the NMS system based on the keypaths and automatically renders the user interface. The routes made available via the module router may be in the form of module/:tag/*keypath. In the module router the route is a pattern that when applied to a URL the user has navigated to yields two parameters: A view tag and a keypath. The JS router uses the keypath to load the data model it identifies. Said keypath is a search path uniquely identifying a data resource instance as specified in the data model 25, or of the YANG schemas. The module router then analyzes the model in order to pick an appropriate widget key. The key may be picked directly from the model. The module router is configured to use a specific bundle by default. The module router now has everything needed to ask the widget engine 64 to retrieve an appropriate widget: a key, keypath, bundle, tag and a graphical user interface model.

Explained on a higher system level the JS router loads data from the data model and from the data base. Accordingly, the JS router could be viewed as a controller in the MVC context. The widget engine then receives a model in the form of a graphical user interface model from the JS router 62 and/or input parameters and selects based on the properties thereof and based on registry data a widget to represent the graphical user interface model. In order to select a widget a key is matched to a registration as described above. This registration comprises parameters required to load and/or instantiate a widget, such as a registration determining which widget from a plurality of to widgets to instantiate, which HMTL template 98 to be used for rendering the widget to be instantiated and which additional parameters or properties if any that is to be provided to the widget that is to be instantiated. Thus, the JS router is configured to assemble a page 96 to be provided as a GUI page 91 of the graphical user interface 61 based on retrieving data from the data model corresponding to parts of the data model as determined by the route and/or by the corresponding URL which a user has selected. In more detail the JS router is configured to load one of more portion of the data model as indicated by the selected route, as explained in more detail above, and to select which one or more widget with associated parameters and/or properties to use for assembling the page 96 representing the one or more portions of the data model to be presented as a page 91 in the graphical user interface 61. In order to render the one or more widgets of the assembled page a HTML template engine 97 selects a HTML template 98 for each of the one or more widgets of the assembled page 96 based on matching the registration of the particular widget with a template of a HTML template registry (not shown) associated to the HTML template engine 97.

According to yet another example of the present invention the navigation process handled by the client application, being orchestrated by the user equipment may include providing a history API based navigation, for example by using the backbone.js history API 94. According to this example the graphical user interface 61 is provided as an AJAX based single page application. Normally, in such applications, the back and forward browser buttons do not work as expected. This may be solved according to the present invention by means of utilizing parts of the Backbone.js lightweight library which provides a history API that provides means for enabling so that navigation works as in traditional web based applications.

FIG. 6 illustrates an overview of the process of providing and handling customizations of the graphical representations provided in the graphical user interface.

In a preferred embodiment of the present invention the client application, such as the client application with reference to FIG. 4A or FIG. 4B, responsible for causing a presentation of the graphical user interface in the user equipment, such as the user equipment 11 exemplified with reference to any of FIG. 1, FIG. 2, FIG. 4A or FIG. 4B includes a number of features associated to the widget engine 64 for registering one or more targeted customizations arranged to alter graphical representations and/or information presented therein of one or more structural element and/or leaf of the data model 29 when presented in the graphical user interface upon selection by the user of the graphical user interface. In other words the one or more targeted customizations are intended to alter the graphical representations provided as a default by the client application orchestrated by the user equipment by means of the widget engine making default selections of appropriate widgets from a built-in widget library based on the widget registry and based on using raw data from the data model 29, such as meta-data from the YANG schemas, and/or data from the associated data base 29, as explained in more detail with reference to FIG. 4A or FIG. 4B.

Accordingly, the one or more targeted customizations override the default mapping of the widget engine 64, which in default is configured to select a widget from the built-in widget library based on default entries in the widget registry 65, wherein said default entries define general mappings or links between data types associated to the structural elements and/or leafs of the data model 29 and widget from the built-in widget library.

The widget engine 64 is able to override the default mappings indicated by the default entries of the widget registry since the widget engine 64, as explained with reference to FIG. 4B, is configured to first check if there is a customization registered for each particular structural element of the data model 25 or portions thereof being selected by a user for display in the graphical user interface and render the graphical representation corresponding to each of said particular structural element as specified by the registered customization.

As an example a particular network operator may desire to have a particular graphical representation in the graphical user interface in the form of a titled check box for a string data type of a particular structural element and/or leaf of one or more particular portions of the data model, such as the data model 25 exemplified with reference to FIG. 4B, whereas in default operation the widget engine is configured to select a text box for all structural elements or leafs having string data type associated to it. In order to perform such customization a resource identifier, such as a unique resource identifier (URI), identifying said particular structural element and/or leaf is entered into a customization's widget registry in combination with a registry key defining the data type as the item to be customized together with a registration or value identifying the widget in the form of the titled check box to be used for rendering this particular structural element and/or leaf. The entered registry information relating to the above described customization is then stored in the widget registry. This means that when the network operator by means of selection, in the graphical user interface selects to view a portion of the data network 1 and/or associated services including the structural element and/or leaf for which the above described customization have been entered into the widget registry that the particular structural element and/or leaf of one or more particular portions of the data model in the graphical user interface will be displayed as a titled check box instead of as a text box.

The process of registering and identifying registered customizations is based on defining registry information in the form of key value pairs 115'-115''''. These key value pairs relating to customizations are then considered by the widget engine 64 upon selecting the one or more widget for representing the one or more graphical user interface model, each of said graphical user interface models as explained in more detail with reference to FIG. 4A or FIG. 4B, being associated to a particular structural element and/or leaf of the data model 29. Said defined registry information relating to customizations being configured to alter the graphical representation in terms of what is presented in the graphical user interface.

The one or more key value pairs also referred to as one or more key registration pairs comprises a key entry with an associated registration or value entry. The key entry defines the target for a particular customization and the associated value or registration defines what the customization consists of. In more detail the key defines which one or more components of the data model 29 that is to be subject to customization when presented in the graphical user interface as determined by the associated value or registration. As an example the key may point to a name of a component or a data type associated to one or more component of the data model. In more detail the key is a text string that uniquely identifies a registered component. This is exemplified with reference to FIGS. 7A-7F.

This can be further controlled by using keypaths/tagpaths 114', 114' and view tags 113 to filter the keys. The result is a fine-grained control over the customization.

The keypaths and/or tagpaths are registry entries defining a search path to one or more resource in the data model, such in the data model 29 exemplified with reference to for example FIG. 2. More particularly the keypath is a search path in the form of a unique resource identifier that uniquely identifies a single resource in a tree like structure, such as in a tree structure of a YANG schema. Thus, the keypath points to exactly one instance such as a unique leaf in a list. Accordingly, by the use of a keypath in combination with a key value pair one unique instance can be targeted with a customization as defined by the key value pair.

A tagpath is a keypath where all list keys are omitted. Where a tagpath might identify multiple YANG elements under a list, a keypath always points to exactly one YANG element. Thus, the tagpath can be used to point to all instances of structural elements such as leafs or columns in a list. As an example a tagpath may point to all instances of a specific leaf in a list, or, if applied to Relational Database Management Systems (RDBMS), every single entry in a specific column in a table. Accordingly, by the use of a tagpath in combination with a key value pair multiple unique instance can be targeted with one or more customization as defined by the key value pair.

The widget registry 65 may also comprise registry entries relating to one or more view tag 113. Generally a view tag identifies an alternative way (view angle or perspective) to look at data or in other words identifies the context within the user interface wherein one or more key value pair defining a customization should be provided. This allows representing one and the same structural element of the data model in multiple ways using for example different widgets or using different attributes of a widget. As an example a certain structural element can be graphically represented by a calendar widget with resolution set to months in one view and by a calendar widget with resolution set to weeks in another view. The views may for example be switched by means of a button in the user interface configured to toggle between the views.

A plurality of keys 115'-115"", or key value pairs defined with or without keypaths/tagpaths/tags can be grouped in a bundle 112.

It is to be appreciated that key value pairs can be defined without any keypath/tagpath/tag/bundle or using a combination of one or more keypath/tagpath/tag/bundle. It is also to be appreciated that there may be more than one bundle configured within the widget registry 65. In the illustrated example with reference to FIG. 6 a first key value pair 115' is defined within a bundle 112, a second key value pair 115" is defined within a first keypath and/or tagpath 114' of a bundle 112, a third key value pair 115''' is defined within a tag 113 of a bundle 112 and a fourth key value pair 115"" is defined within a second keypath and/or tagpath 114" of a tag 113 of a bundle 112.

The widget registry 65 may also comprise registry entries relating to one or more matcher functions 116. A matcher function is an array where you can register special matching functions. A matcher function can for example be used in those cases where matching a widget is just not possible—or feasible—using just keys, key-/tagpaths and tags. An example of this is where you want to return a special widget for a certain key for all sub-paths of a certain keypath. A matcher function takes four parameters: bundle, tag, keypath and key. Said matcher function operable using one or more conditional operators and/or logical operators on at least one parameter selected from a group of parameters comprising said above mentioned parameters bundle, tag, keypath and key so as to identify at least one unique element and/or unique sub-elements for which customization as defined by the customization registration is to be provided. For performance reasons the matcher function is preferably configured to fail as fast as possible. Once a matcher function is registered it will always run when searching for a customization item. This is because the results from a matcher take precedence over the normal key—keypath—tagpath—tag registration. It is therefore preferable that a matcher function matches in a very precise manner. A matcher function returns undefined if no match is found.

The widget registry 65 is linked to at least one widget library 110,111. The at least one widget library comprises a plurality of widgets referable to by the widget registry by means of the key value pairings. The widget library is configured to be stored on the memory unit of the user equipment, such as the user equipment exemplified with reference to FIGS. 2, 4A and 4B. The widget library is also configured to be accessible for the widget engine to allow for selection of widgets from the widget library using the widget registry.

According to an embodiment, the widget library comprises two separate widget libraries in the form of a default widget library 110 also referred to as a built-in widget library and a custom widget library 111. The default widget library comprises widgets used as default in the process of selecting widgets as defined by default registry information provided in the widget library i.e. entries linking structural element and sub elements to widgets in the default widget library based on the date type associated to the structural element and sub elements. The custom widget library comprises one or more custom widgets which may be used for providing customized graphical representations for one or more structural element and sub element. Said one or more custom widget are referable to by means of defining entries in the widget registry in the form of key value pairs pointing for one or more structural element and/or sub element to the one or more custom widgets.

According to an embodiment, the keypath and tagpath are preferably combined with a prefix uniquely identifying a particular portion of the data model, such as uniquely identifying a particular YANG schema being part of the data model. An example of the use of a prefix can for example be seen in FIG. 7C which points to the module named "config" as illustrated in FIG. 3B.

According to an embodiment the registration entries related to customization is performed in a registry separate from the registry for default operation. In more detail according to this embodiment the registration entries related to customization is performed in a separate registry wherein said separate registry is accessible for the widget engine 64 by means of being storable of the digital storage medium or memory 54 of the user equipment. This separation of default registry data and customized registry data may also be applied to the other registries of the client applications, such as the contextual settings registry, the life cycle handler registry exemplified with reference to FIG. 4B.

It is to be appreciated that the above described handling of customization described with reference to FIG. 6 is related to customization of selection of widgets representing different structural element and/or leafs of the data model, such as different structural element and/or leafs of the YANG schemas, also may be provided in a similar fashion in any of the registries associated to the translation engine, the contextual settings engine and the life cycle engine, exemplified with reference to FIG. 4B, so as to provide customizations relating to one or more of at least one translation, at least one life cycle handler and at least one contextual setting.

With simultaneous reference made to FIG. 6 the customization capability of the graphical user interface will now be described with reference to FIG. 7A.

As a way of illustration, FIG. 7A shows some exemplary registry entries 101' of at least one registry, such as the translation registry of the client application, such as the client application orchestrated by the user equipment 11 to provide customizations of the graphical user interface, exemplified with reference to FIG. 4B. As explained with reference to FIG. 6, the basic principle of providing one or more targeted customizations is based on providing one or more key value pairs as entries into one or more registry, such as the widget registry or the translation registry, exemplified with reference to FIG. 4B. This is exemplified in more detail with continued reference to FIG. 7A. The exemplary registry entries 101' define a bundle statement, allowing grouping a number of key value registrations. The exemplary registry entries 101' further defines a tag statement as part of the bundle grouping. The tag statement is also referred to as a view tag statement, which allows defining the context in terms of in which views of the graphical user for which the key value registration is to be used. This tag statement may for example be used to display/render one and the same particular structural element differently, such as by means of using different widgets, in different views or pages of the graphical user interface. This may for example be accomplished by means of registering at least one key value pair within a bracketed view tag statement, wherein the view tag statements identify a separate view angle or perspective by means of that the view tag statement being embeddable into HTML code. Thus, in case the registration within the view tag statements points to a particular widget for a particular structural element and/or leaf of the data model this particular widget will only be used to represent the particular structural element or leaf of the data model in the graphical user interface when a user has navigated to a page, via an URL, having the view tag statement embedded as HTML code therein. The exemplary registry entries 101' further defines a keypath and/or tagpath statement as part of the bundle grouping which are defined within the graphical user interface context based on a view tag statement named "tag". In more detail the tag statement indicates where, in terms of context, in the graphical user interface the graphical content(s) in the form of the customization defined within the tag statement should appear by means of that the tag statement is embeddable into HTML code of one or more pages to be displayed in the graphical user interface.

The keypath and/or tagpath statement may further include a prefix pointing to a particular portion of the data model, such a particular YANG schema. The last registry entry of the exemplary registry entries 101' defines the actual key value pair i.e. which particular customization that is intended for which particular component of the data model. In case the customization relates to a translation then the registration or value could for example correspond to what the actual translation should be and the key could correspond to which component that is intended to be translated, such for example the name label of a structural element. In case the customization relates to providing an alternate widget then the registration or value could for example correspond a link or mapping identifying the alternate widget in the widget library and the key could correspond to which component that is intended to be rendered using this alternate widget, such for example the data type of a structural element. Accordingly, the bundle statement allows to group a number of key value pairs, the tag or view angle statement allows to define the context in the graphical user interface wherein this customization as defined by the key value should take place, the keypath and/or tagpath statement allows to define the context of the data model 29, i.e. for which portions and/or for which particular structural elements and/or leaf for which this customization as defined by the key value should take place.

It is to be appreciated that a key value pair may be defined in a registry without any of the bundle, keypath/tagpath statements and/or with a combination of at least one of the bundle statement, the keypath/tagpath statement or tag statement. As explained above this will affect which components/elements of the data model 29 that will be affected by said customization in terms of graphical representation, as defined by the key value pair. Also a single tagpath/keypath statement may have a number of key value pairs associated to it. This is also the case for a tag statement which in addition may have a number of keypath/tagpath statements, each with one or more key value pairs.

It is further to be appreciated that the actual value of the registration relating to the customization for each key of the key value pairs may be associated to any form of customization including but not limited to at least a translation, at least a custom widget, at least a contextual setting, at least a life cycle handler.

With simultaneous reference made to FIG. 3B and FIG. 6 the customization capability of the graphical user interface will now be described with reference to FIG. 7B.

As a way of illustration, FIG. 7B shows some exemplary registry entries 102' of at least one registry, such as the translation registry of the client application, such as the client application orchestrated by the user equipment 11 to provide the graphical user interface, exemplified with reference to FIG. 4B. The registry entries 101' includes a bundle statement, such as a bundle statement exemplified with reference to FIG. 6, configured to group a number of entries associated to customizations. In this example for purpose of illustration the bundle statement only includes a single entry defining a translation in the form of a key value pair. It is thus to be appreciated that the exemplified registry entries 102' with reference to FIG. 7B may comprise additional registry entries associated to for example translation grouped by means of the bundle statement. In this example the single registry entry includes a key value pair, in the form of a key, defining a string that uniquely identifies one or more particular registered component of the data model, such as the data model exemplified with reference to FIG. 3B and a registration or value associated to this key, wherein said value or registration is corresponding to the customization registered for the one or more unique components. In this example the key is the string chassis and the associated value or registration of the key is Chassis. This means that all occurrences of the text chassis as specified in the data model or portions thereof selected by the user for view in the graphical user interface will be altered, by means of the translation engine as exemplified with reference to FIG. 4B, to read Chassis with a capital c instead of a lower case c as declared in the data model 29. With reference to FIG. 3B this would mean that all chassis, modeled by the data model and specified by the configuration data base, part of the container declaration grouping included the data model of FIG. 3B, would be displayed in the graphical user interface with the text Chassis.

It should be appreciated that the process of handling customizations such as translations selection of widgets by means of utilizing key value registrations in combination with for example keypaths/tagpaths statements etc. is by no means limited to affecting customization solely associated to structural elements or leafs of the data model. Instead this process could be used in a similar fashion for handling customization of properties of the graphical user interface itself wherein said properties is not directly linked to elements of the data model or attributes thereof. As an example this process could be used to handle customizations of for example one or more menu of the graphical user interface, such as the side menu or side bar menu 92 exemplified with reference to FIG. 5B.

With simultaneous reference made to FIG. 3B and FIG. 6 the customization capability of the graphical user interface will now be described with reference to FIG. 7C.

As a way of illustration, FIG. 7C shows some exemplary registry entries 103' of at least one registry, such as the translation registry of the client application, such as the client application orchestrated by the user equipment 11 to provide the graphical user interface, exemplified with reference to FIG. 4B. The registry entries 103' include a first tagpath statement a) followed by a key value pair registry entry. The tagpath statements as explained with reference to FIG. 6 targets a customization in as defined by at least one key value pair for each instances, structural components or sub components, of the same kind within a list. The same kind may for example relate to all instances being leafs.

With simultaneous reference to FIG. 3B the tagpath statement points to all leafs of all interfaces of all slots of all chassis of the module named "config". The key value pairs defined for the leaf components being part of the interface list component include a first key value pair in the form of a key pointing to a name leaf i.e. the name label of the interface with an associated registration or value defines an alternate naming of the label in the form of "Interface name". A second tagpath statement b) is followed by a key value pair registry entry. The second tagpath statement point to all leafs of all interfaces of all slots of all chassis of the module named "config". The key value pairs defined for the leaf components being part of the interface list component include a first key value pair in the form of a key pointing to a "tx" leaf, i.e. the "tx" label of the interface with an associated registration or values defines an alternate naming of the label in the form of "Transmitted packets". This means that when the module named "config" is selected by the network operator for view in the graphical user interface, the text describing the name label for each of the above described leafs being parts of the defined interfaces, will read "Interface name" instead of "name" and "Transmitted packets" instead of tx. The above will also be valid for all interfaces of all slots of all chassis associated to the module named "config" as defined in the configuration data base 29.

The registry entries 103' further includes two examples of keypath statements c), d), each keypath statements c) and d), such as keypath statements as exemplified with reference to FIG. 6, followed by an associated key value pair registry entry.

A first keypath statement c) defines a key value pair for a particular leaf in a list. With simultaneous reference to FIG. 3B the first keypath statement points to an interface with id 1 of a chassis slot with id 1. The key value pair defined for this leaf list component is defined with a key name pointing to the label name of the interface with id eth1 and the registration or value defines an alternate naming of the label in the form of "Backup interface name". This means that when the interface with id 1 of a chassi slot with id 1 part of the module config is selected by the network operator for view in the graphical user interface the text label describing the name of the interface with id 1 of a chassi slot with id 1 would be displayed as "Backup interface name" instead as "name". Thus, all interfaces of all slots of all chassis within the module named "config" except the interface with id eth1 of the slot with id 1 will according to this registration be displayed with a label reading "name", whereas the interface with id eth1 of the slot with id 1 will have the name label displayed as "Backup interface name". The actual name of the interfaces may be retrieved from information in the configuration data base 25.

A second keypath statement d) defines a key value pair for a particular leaf in a container. With simultaneous reference to FIG. 3B the second keypath statement points to the leaf named logging-enabled of the container named settings. The key value pair defined for this container leaf component is defined with a key name pointing to the name of the leaf, i.e. logging-enabled, the registration or value defines an alternate naming of the leaf in the form of "Enable logging". This means that when the container named settings part of the module config is selected by the network operator for view in the graphical user interface the text describing the name label for this particular leaf, i.e. logging-enabled, of the container named settings would be displayed with a label reading "Logging Enabled" instead of "logging-enabled".

The registry entries 103' further includes an example of a view tag statement e), such as view tag statement as exemplified with reference to FIG. 6, which contains a keypath statement followed by an associated key value pair registry entry. With simultaneous reference to FIG. 3B the keypath statement, defined within the view tag statement named "mobile", points to the leaf named "logging-enabled" of the container named "settings". The key value pair defined for this container leaf component is defined with a key name pointing to the name of the leaf, i.e. "logging-enabled", the registration or value defines an alternate naming of the leaf in the form of "Loggin enabled". This means that when the container named settings part of the module config is selected by the network operator for view in the graphical user interface by means of navigating to an URL having the view tag statement named "mobile" embedded therein the text describing the name label for this particular leaf, i.e. logging-enabled, of the container named settings would be displayed with a label reading "Logging enabled" instead of "logging-enabled".

All the registry entries 103' are in this example defined within a bundle grouping statement.

In these examples the tagpath and keypath statements includes a prefix in the form of a prefix "config" pointing to the module with name "config" as exemplified with reference to FIG. 3B. The prefix uniquely identifies a portion of the data model 29, such as a particular YANG schema being part of the data model 29.

It is to be appreciated that the above described examples of customization of the graphical user interface, with reference to FIG. 7C, may as well be applied to other forms of customizations other than translation related customizations. For example in a similar fashion keypaths/tagpaths may be configured with a different key value pair registration causing for example a customization of widgets and/or a customization of contextual settings for a widget. As an example a tagpath and/or keypath may be used to point out one or more particular component of the data model which should be rendered by means of a custom widget instead of default i.e. built-in widget.

With simultaneous reference made to FIG. 6 the customization capability of the graphical user interface will now be described with reference to FIG. 7D.

As a way of illustration, FIG. 7D shows some exemplary registry entries 104' of at least one registry, such as the widget registry of the client application, such as the client application orchestrated by the user equipment 11 to provide the graphical user interface, exemplified with reference to FIG. 4B. The registry entries 104' include a two bundle statements, each grouping a plurality of widget registration registry entries. A first set of widget registration registry entries of a first bundle statement define a key linking the data type "string" to a registration in the form of a widget named "Text" that is to be used for representing data of the data type string and a HTML template named "text.html" to be used for rendering the widget named "Text". Thus, this registration will cause all parts of the data model having a string data type to be rendered using the "Text"-widget. A second set of widget registration registry entries of the first bundle statement define a key linking the data type "boolean" to a registration in the form of a widget named "Boolean" that is to be used for representing data of the data type boolean and a HTML template named "boolean.html" to be used for rendering the widget named "Boolean". Thus, this registration will cause all parts of the data model having a boolean data type to be rendered using the "Boolean"-widget.

A first set of widget registration registry entries of a bundle statement named "pages" comprises a view tag named "calendar.month" which contains a keypath statement pointing to calendar.events for which the key calendar linking to a widget named "calendar.Month" and an HTML template named month.html for rendering the widget named "calendar.Month" should be associated. Thus, this registration will cause graphical user interface pages in which the view tag "calendar.month" is embedded to display the calendar.events, instance indicated by the keypath, using the widget "calendar.Month" rendered by the HTML template month.html i.e. the calendar.events instance will be displayed using a monthly resolution. A second set of widget registration registry entries of a bundle statement named "pages" comprises a view tag named "calendar.week" which contains a keypath statement pointing to calendar.events for which the key calendar linking to a widget named "calendar.Week" and an HTML template named week.html for rendering the widget named "calendar.Week" should be associated. Thus, this registration will cause graphical user interface pages in which the view tag "calendar.month" is embedded to display the calendar.events, instance indicated by the keypath, using the widget "calendar.Wonth" rendered by the HTML template week.html i.e. the calendar.events instance will be displayed using a weekly resolution. This enable to graphically represent one and the same instance in the graphical user interface using different view angles i.e. one with weekly resolution and one with monthly resolution. By means of including a toggle function such as a toggle button in the graphical user interface a user is enabled to switch between the monthly and weekly resolution.

With simultaneous reference made to FIG. 6 the customization capability of the graphical user interface will now be described with reference to FIG. 7E and FIG. 7F.

As a way of illustration, FIG. 7E and FIG. 7F shows some exemplary registry entries 105'-105" (starting with code section 105' and continuing on with code section 105") of at least one registry, such as the widget registry of the client application, such as the client application orchestrated by the user equipment 11 to provide the graphical user interface, exemplified with reference to FIG. 4B. The registry entries 105'-105" comprises an example of registry entries used to view a list in an alternative fashion. The principal parts of the registry entries 105'-105" define a view tag statement named "dashboard" comprising a tagpath pointing to the lists of all instances of interfaces of the config module exemplified with reference to FIG. 3B. For this tagpath the associated key and registration links the list to a widget named ListOfBrokenInterfaces to be rendered by the HTML template list-of-broken.interfaces-html. The registry entries of code section 105" define statements for retrieving/querying which interfaces if any that are broken i.e. for which interfaces that the leaf failure, as exemplified in FIG. 3B, equals true. Thus, this registration will cause graphical user interface pages in which the view tag "dashboard" is embedded, or activated by means of toggling, to display the interface in an alternative way i.e. as a list of broken interfaces instead of as a list of all interfaces.

With simultaneous reference made to FIG. 6 the customization capability of the graphical user interface will now be described with reference to FIG. 7G.

As a way of illustration, FIG. 7G shows some exemplary registry entries 106' of at least one registry, such as the widget registry of the client application, such as the client application orchestrated by the user equipment 11 to provide the graphical user interface, exemplified with reference to FIG. 4B. The registry entries 106' comprise an example of registry entries used to present an alarm list in an alternative fashion in the graphical user interface as a complement to presenting an alarm list as a standard list. The alarm list could be obtained by means of performing top-down navigations in the graphical user interface. However, this requires a user to navigate multiple levels down in the data model represented by the graphical user interface, i.e. starting on a module level and moving downwards. By means of using nested registrations, such as the nested registrations exemplified in the registry entries 106', the alarm list can be rendering directly using a dedicated component accessible via for example a button of the graphical user interface.

In more details by means of using a nested registration as FIG. 7G exemplifies, it is possible to define a custom user interface widget to render a data model that otherwise would have been automatically rendered using a standard user interface component and then only if the user has navigated to that particular part of the data model via a matching view tag. This is achieved by using a keypath or a tagpath to identify a portion of the data model and by registering a custom user interface widget for the key that would be used for selecting a user interface widget for rendering the said data model portion and by grouping the said keypath and/or tagpath, which in turn groups one or more said keys, under a registered view tag. Only when the said view tag is used in combination with the said keypath and/or tagpath registration and said key, is the custom widget, registered under the said key, selected for rendering the given data model portion. By these means a custom widget can be selected by the user interface for rendering a specific data model in a customizable way, without affecting the rendering of other parts of the data model.

The example registration in FIG. 7G demonstrates how a custom widget can be registered for rendering an alarm list user interface. The view tag statement is used to limit the scope of the customization to a particular view perspective. The generated user interface is navigable, that is the user navigates the data model tree via user interface components. In this case the view perspective is set to the alarm list via the "ncs.alarms" view tag statement. User interface components that are not scoped using a view tag are unaffected by this statement. The keypath statement is then used to identify the alarm list data model. By default, the alarm list could be rendered as a normal table, hence the key "inline-table". In this example the alarm list is to be rendered using a custom component so the widget to key registration is overridden using a new widget to key registration. Put together, this allows a customizer to add a button to the user interface that, when clicked, navigates to a portion of the user interface using a specific view tag to identify the user interface view perspective and in the case of the example in FIG. 7G this would be "ncs.alarms". Additionally the button could provide a keypath for a JS router to load the alarm list data model. The JS router would then analyze the data model and decide to use the "inline-table" as a key for selecting a user interface component to render the said alarm list data model. The widget engine would then receive the request and the given view tag, keypath and widget key. The widget engine would then select the custom alarm list based on the example widget registration.

With simultaneous reference made to the previous drawings and the reference numerals used therein, embodiments of a method for monitoring and/or reconfiguring data network nodes 3, 5, 7 and/or associated services in a data network 1 will now be described with reference to FIGS. 8 to 10.

Figures 8, 9:
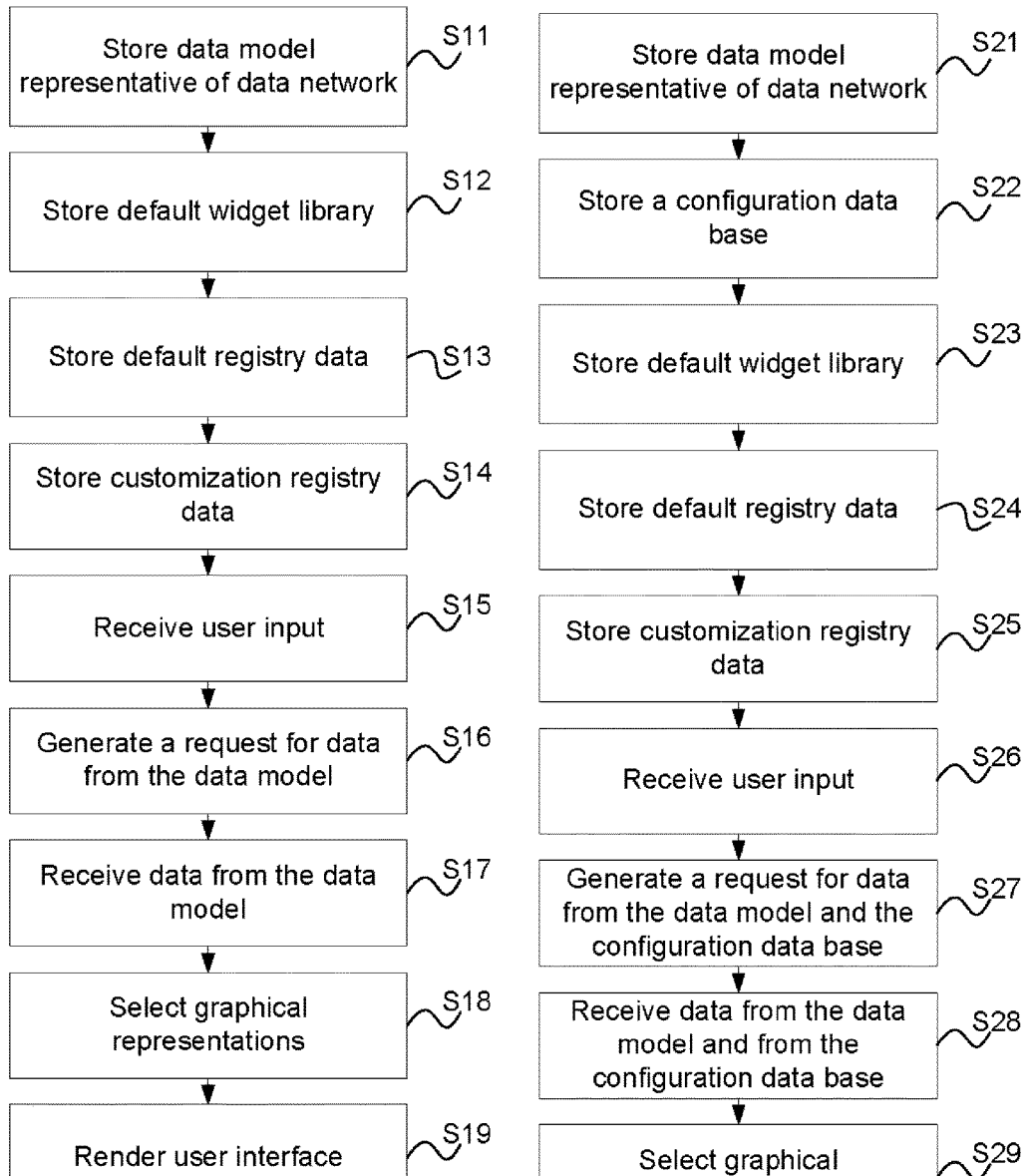
FIGS. 8 to 10 are flowcharts illustrating different aspects of a method for providing a graphical user interface for monitoring/managing a data network according to embodiments of the invention.

FIG. 8 illustrates a first embodiment of a method for providing, in a user equipment 11, a graphical user interface 61 for monitoring/managing a data network 1, such as a data network 1 having data network nodes 3, 5, 7 with associated configured services.

In a first step, S11, a data model 29 representing a model of the current configuration of a data network is stored. The model having a plurality of structural elements and sub elements, each associated to a data type of a set of data types. The set of data types may for example comprise a plurality of data types including but not limited to a String data type, a Boolean data type, a Uint16 data type and a Uint64 data type. The data model 29 may comprise a YANG data model, such as a YANG data model, which adheres to the YANG RFC (6020) specification as defined by NETCONF Data Modelling Language Working Group (NETMOD). The YANG data model may comprise a number of YANG schemas. The structural elements and sub-elements may comprise a number of elements including but not limited to a module, a container, a leaf, a list, a leaf list, an action, a grouping. The data model 29 may be stored in a memory unit of the network management system such as in the memory 31 of the network management system as exemplified with reference to FIG. 2.

In a second step, S12, a default widget library is stored. The default widget library comprises a plurality of widgets. The default widget library may be configured to be stored in a memory unit of the user equipment 11, such as configured to be stored in a memory 54 of the user equipment as exemplified with reference to FIG. 2. The widget library, such as the built-in widget library exemplified with reference to FIG. 6, in more detail comprises a plurality of widget, intended to provide basis for rendering graphical representation of the structural elements and sub-element of the data model, modelling the current configuration of the data network 1 so as to provide a graphical user interface 61.

The widget library may also according to an example be configured to be stored in a memory unit of the network management system 9, such as in the memory unit 52 of a server 50 of the network management system 9 or in a memory unit 31 of the network management system 9. According to this example the default widget library is stored in the memory unit of the user equipment 11 by means of loading and locally storing information relating to the widget library from the server, such as for example by means of loading the widget library following a server logon procedure performed by means of the user equipment 11.

In a third step, S13, default registry data is stored. In more detail the default registry data is stored in a registry in the form of a widget registry, such as in the widget registry 65 as exemplified with reference to for example FIG. 4B. The default widget registry data having entries identifying for each data type of the set of data types of the data model 29, a default graphical representation, in the form of at least one predetermined widget 66 from the default widget library. In other words the default registry data provides a link or mapping between data types of the data model and predetermined widgets of the built-in widget library.

In a similar fashion to what is described in connection to step S12 also the default registry data referred to in step S13 may be storable in a memory unit of the network management system 9 and/or in a memory unit of the user equipment 54.

In a fourth step, S14, customization registry data is stored. In more detail the customization registry data, comprises at least one entry, defining at least one key with an associated customization registration, said at least one key identifying at least one element and/or sub element of the data model an alternative graphical representation as defined by customization registration is to be provided in a graphical user interface 61 operated by the user equipment 11. The alternative graphical representation differing with from the default graphical representation, as defined by the default registry data, respect to at least one attribute, such as textual representation, graphical appearance and life cycle behaviour. The alternative graphical representation may be configured/handled by one or more of the contextual settings engine, the translation engine and the life cycle engine, by means of providing entries in the registries associated thereto, as exemplified with reference to for example FIG. 4B.

In a similar fashion to what is described in connection to step S12 also the customization registry data referred to in step S14 may be storable in a memory unit of the network management system 9 and/or in a memory unit of the user equipment 54.

In a fifth step, S15, a user input is received. I more detail user input is received identifying a portion of the data network 1, with associated configured services, of interest for display in the user interface as indicated by the user in the user input. The user may for example be presented with a selection menu provided in the user interface 61 so as to allow the user to identify/select a portion of the data network of interest for display in the user interface 61.

In a sixth step, S16, a request for data from the data model 29 is generated. In more detail the request is generated based on the user input. This means that the information which is requested relates to the portion of the data network which of interest for display in the graphical user interface. The user request may for example be generated by the rendering engine 151 as exemplified with reference to FIG. 4A or by the JS router 62 as exemplified with reference to FIG. 4B. The request is sent from the rendering engine 151 of the client 150 as exemplified with reference to FIG. 4A, or from the JS router 62 of the client as exemplified with reference to FIG. 4B via a link to a server 50, such as to the server 50 of the network management system 9. Upon receiving said generated request the server responds by sending back the requested information which it retrieves from the memory unit 31 of the network management system 9.

In a seventh step, S17, data from the data model is received. Said data received by from server 50 being representative of the portion of the data network of interest as indicated by the user in the user input provided to the client. In more detail said data received from the server being parts of the data model which corresponds to the portion of the data network of interest as indicated by the user. The data received from the server may also include data from a configuration data base 25 stored at the memory unit of the network management system 9. Said configuration data base 25 having configuration data associated to the data model reflecting the current configuration of the data network.

In an eight step, S17, graphical representations are selected. In more detail graphical representation for each structural element and sub-elements of the data of the data model being representative for portion of the data network of interest as indicated by the user in the user input. The selection of graphical representations is based on selecting the alternative graphical representation for each element of the received data, having associated the at least one key and the default graphical representation for each element of the received data, not having associated the at least one key. In other words the selection process first checks if there are any form of customization registered for one or more particular structural element of the data of the data model being representative for portion of the data network of interest and selects and alternative graphical representation if such is registered and if no such alternative graphical representation is registered in the customization registry then the selection process selects a graphical representation as defined by the default registry data.

Accordingly, the process of selection is based on the data associated to the default registry data and the customization registry data. More details of how selection may take place are explained with reference to for example FIG. 4A and FIG. 4B.

In a ninth and final step, S18, a user interface is rendered. In more detail the selected graphical representations are used for rendering the graphical user interface. The rendering may for example be performed by the rendering engine 151 as exemplified with reference to FIG. 4A, or by the JS router 62 as exemplified with reference to FIG. 4B.

The user interface may for example be rendered automatically by means of the user equipment 11 orchestrating a client application.

In one example the method illustrated with reference to FIG. 8 may comprise an additional step in the form of a ninth step (not shown). In the ninth step the graphical representation are logically assembled. In more detail the graphical user interface models being provided with associated widgets as explained with reference to FIG. 4B are grouped into a model structure so be able to provide a user interface which facilitates for a user to identify the different structural elements and sub elements included therein as represented by the graphical representations. The ninth step is performed before the eight steps S18.

In yet another example the method illustrated with reference to FIG. 8 may comprise an additional step in the form of a tenth step (not shown). In the tenth step a custom widget library is stored. The custom widget library comprises at least one custom widget i.e. a widget different from the widget present in the default or built-in widget library. The tenth step is performed before the fifth step S18, such as performed in between the first step S11 and the second step S12. In this example the step S14 may comprise storing customization registry data in the form of customization registry data having at least one entry, defining at least one key with an associated customization registration, wherein said associated customization registration is related to defining an alternative graphical representation in the form of a custom widget from the custom widget library. This means a custom widget being different than any widget included in the default widget library can be used for graphically representing one or more particular element or sub-element of the data model as presented in the graphical user interface.

FIG. 9 illustrates a more detailed embodiment of a method for providing, in a user equipment 11, a graphical user interface 61 for monitoring/managing a data network 1, such as a data network 1 having data network nodes 3, 5, 7 with associated configured services.

A first step S21 correspond to the step S11, and a third step S23 through a tenth step S30 substantially correspond to the second step S12 through the ninth step S19 of the method illustrated in FIG. 8.

Accordingly, as compared to the method illustrated in FIG. 8 the method of FIG. 9 comprises an additional step in the form of a second step S22. In this second step a configuration data base is stored 25. In more detail the configuration data base comprises configuration parameters associated to the data model 29. The configuration data base 25 may be stored in a memory unit of the network management system such as in the memory 31 of the network management system 9 as exemplified with reference to FIG. 2.

In this embodiment the additional information relating to information of the configuration data base which is stored is used in the steps seventh, eight and tenth steps S27, S28 and S30. The information is preferably also used in the ninth step S29.

In more detail in the seventh step S27, a request for data from the data model and information from the configuration data base is generated. The request is generated based on the received user input which is explained in more detail in connection to step S15 of the method illustrated with reference to FIG. 8.

In the eight step S28, data from the data model and information from the configuration data base is received.

In the tenth and final step S30, the selected graphical representations in combination with information from the configuration data base is rendered in the user interface. Said selected graphical representations and said information from the configuration data base reflecting the portion of the data network of interest as indicated by the user in the user input.

The additional information from the configuration data base may also be used in connection to the ninth step S29, since the information for example comprises definitions with regard to the number of instances of structural element. Thus, the information can be used for determining the number of selected graphical representations to instantiate.

Figure 10:
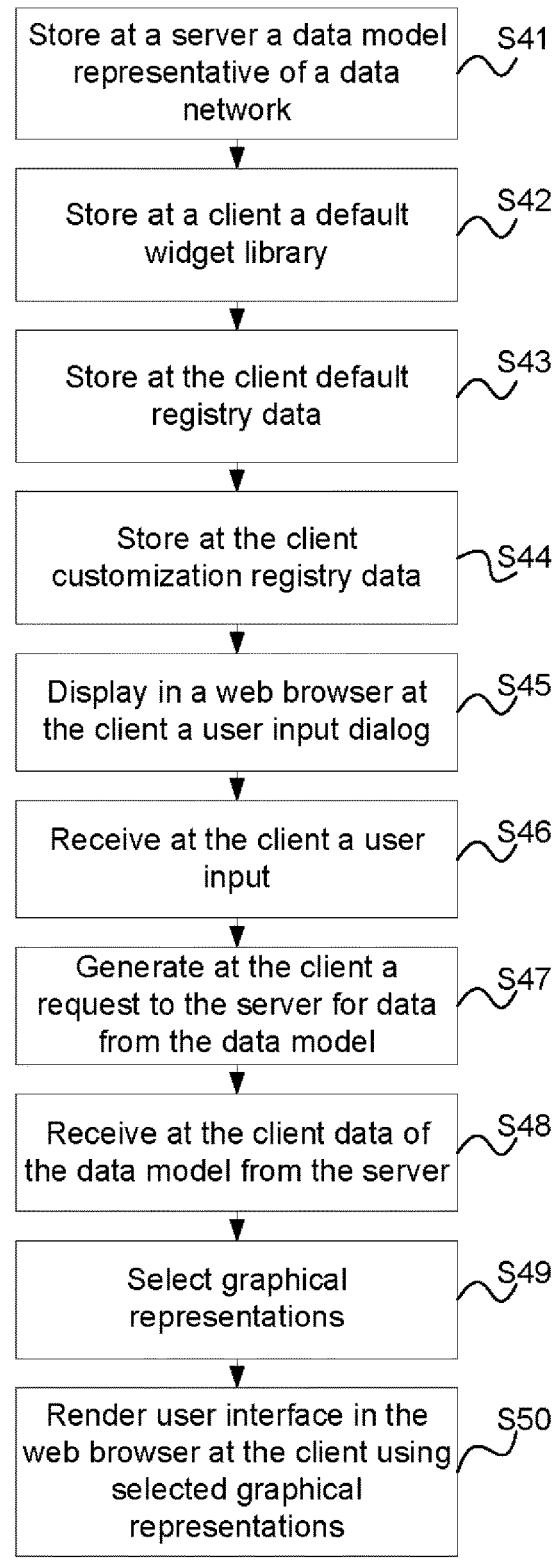

FIG. 10 illustrates an embodiment of a method for providing, in a user equipment 11 operating a client, a web based graphical user interface 61 for monitoring/managing a data network 1, such as a data network 1 having data network nodes 3, 5, 7 with associated configured services.

In a first step, S41, a data model 29 is stored at a server 50. In more detail said data model is stored in a memory unit accessible to the server 50 located at a network management system 9, such as in a memory unit 31 of the network management system 9. Said data model 29 being representative of the current configuration of the data network 1 with associated configured services. The data model 29 has a number of structural elements and sub-elements modeling the current configuration of the data network. Each of said elements and sub elements has associated thereto a data type of a set of data types.

In a second step, S42, a default widget library is stored at a client. The default widget library or built-in widget library, such as the built in widget library exemplified with reference to FIG. 6, comprising a plurality of widgets 66 forming the basis for transforming the structural elements and sub-elements of the data model into graphical representations for presentation in a graphical user interface 50. The default widget library may also according to an example be configured to be stored in a memory unit of the network management system 9, such as in the memory unit 52 of a server 50 of the network management system 9 or in a memory unit 31 of the network management system 9. According to this example the default widget library is stored in the memory unit of the user equipment 11 by means of loading and locally storing information relating to the widget library from the server, such as for example by means of loading the widget library following a server logon procedure performed by means of the user equipment 11.

In a third step S43, default registry data is stored at the client. Said default registry data having entries identifying for each data type of the set of data types, a default graphical representation, in the form of at least one predetermined widget from the default widget library. In a similar fashion to the above described step S42 the default registry data may be stored at the network management system for subsequent download procedure by the client so as to retrieve and store the default registry data locally at the client.

In a fourth step S44, customization registry data is stored at the client. Said default registry data having at least one entry, defining at least one key with an associated customization registration, said at least one key identifying at least one element and/or sub element of the data model for which an alternative graphical representation as defined by customization registration is to be provided in a graphical user interface 61 operated by the client. The alternative graphical representation differing with from the default graphical representation, as defined by the default registry data, respect to at least one attribute, such as textual representation, graphical appearance and life cycle behaviour. In a similar fashion to the above described steps S42 and S43 the customization registry data may be stored at the network management system 9 for subsequent download procedure by the client by means of logging on to the server 50 of the network management system 9 so as to retrieve and store the default registry data locally at the client. In fact the entire client, such as the client application including registry data and widget library, may be stored at the network management system 9 for subsequent download procedure by the use of the user equipment 11 so as to enable the user equipment to fetch and execute the client application.

In a fifth step S45, a user input dialog is displayed in a web browser. Said user input dialog configured to allow a user to identify a portion of the data network of interest for display in the user interface by means of interacting with the web browser via input means of the user equipment 11. The user may for example be presented with a selection menu provided in the web browser so as to allow the user to identify/select a portion of the data network of interest for display in the user interface. As an example the user may be presented with a user dialog allowing selection of for example at least one entity of a number of entities including but not limited to a number of data nodes, number of services, number of devices, number of device modules or portions thereof available in the current configuration of the data network. The user input dialog may for example be provided by means of orchestrating the client application. The user input dialog may be preconfigured or customizable by means of for example a customizable HTML template. In this context the user input dialog may be a start page in a paged user interface as is typical for a web based user interface.

In a sixth step S46, a user input is received at the client. In more detail the received user input comprises information entered by a user, wherein said information entered by the user identifies the portion of the data network of interest for display in the user interface, such as a particular node or service present in the current configuration of the data network which is modelled by said data model 29 and detailed with regard to configuration parameters in said configuration data base 25 associated to said data model 29.

In a seventh step S47, a request for data from the data model 29 is generated from the client to the server 50. Said request is based on the received user input identifying the portion of the data network of interest for display the graphical user interface to be presented within the web browser of the user equipment 11. The request is sent from the client via a data service layer and a link to the server 50. Upon receiving said generated request the server responds by sending back the requested information which it retrieves from the memory unit 31 of the network management system 9.

In an eight step S48, data sent from the server 50 is received at the client. Said data received by from server being representative of the portion of the data network of interest as indicated by the user in the user input provided to the client. In more detail said data received from the server being parts of the data model which corresponds to the portion of the data network of interest as indicated by the user. The data received from the server may also include data from a configuration data base 25 stored at the memory unit of the network management system 9. Said configuration data base 25 having configuration data associated to the data model reflecting the current configuration of the data network.

In a ninth step S49, graphical representations are selected at the client. In more detail graphical representation for each structural element and sub-elements of the data of the data model being representative for portion of the data network of interest as indicated by the user in the user input. The selection of graphical representations is based on selecting the alternative graphical representation for each element of the received data, having associated the at least one key and the default graphical representation for each element of the received data, not having associated the at least one key. In other words the selection process first checks if there are any form of customization registered for one or more particular structural element of the data of the data model being representative for portion of the data network of interest and selects and alternative graphical representation if such is registered and if no such alternative graphical representation is registered in the customization registry then the selection process selects a graphical representation as defined by the default registry data.

Accordingly, the process of selection is based on the data associated to the default registry data and the customization registry data. Thus, by means of registering customization registry data in form of key value pairs, pairing a specific customization to one or more elements of the data model a customized user interface can be provided. In order to more specifically target one or more unique element of the data model the key value pairs can be combined with for example a search path such as keypath or tagpath as exemplified with reference to for example FIG. 6. Apart from altering the graphical representations in terms of selection of widgets for one or more element, such as one or more unique element, also the life cycle behaviour, the textual representation, the contextual settings of the selected widget providing the graphical representation reflecting the one or more element, such as one or more unique element can be altered by means of the providing customization registry data associated to one or more of a translation registry, a contextual settings registry and a widget life cycle registry. This is exemplified in more detail with reference to FIG. 4B.

In a tenth and final step S50, the selected graphical representations are rendered in the user interface in the web browser of the client. In more detail the selected graphical representations are used for rendering the graphical user interface.

In one example the method illustrated with reference to FIG. 10 may comprise an additional step in the form of an eleventh step (not shown). In the eleventh step the rendered selected graphical representation are formatted for the web browser. This step may be performed before the above mentioned tenth step S50.

In this example the method illustrated with reference to FIG. 10 may comprise an additional step in the form of a twelfth step (not shown). In the twelfth step HTML templates are stored at the client. This step is performed before the above mentioned eleventh step, such as for example between the fourth S44 and fifth step S45. This allows performing the above mentioned eleventh step based on using said stored HMTL templates. The HTML templates may for example comprise predefined HMTL code associated to the widgets of the widget library so as to enable to render the corresponding graphical representations in the web browser.

The invention provides a customizable graphical user interface, such as a customizable web based user interface, enabling for one or more network operator or interested party to manage boilerplate operations associated to the data network, wherein said boilerplate operations may relate to operations such as logon/logout, fetching and storing data, executing actions and transactions management. The customizable user interface can according to the present invention automatically render a data model, modelling a data network, such as a YANG data model comprising a number of YANG schemas, so as to form the graphical user interface.

While the invention has been particularly shown and described with reference to preferred embodiments thereof, it will be understood by those skilled in the relevant art that various modifications with regard to form and detail may be performed without departing from the scope of the invention.

I claim:

1. A method for providing a graphical user interface in a user equipment associated to a network management system for monitoring and configuring a data network, the method comprising:
    storing information comprising:
        a data model representative of the data network, wherein said data model has a plurality of elements corresponding to devices in the data network, each of the plurality of elements comprises one or more sub elements, and each of the one or more sub elements is associated to a data type of a set of data types,
        a configuration database comprising configuration information, the configuration database comprising a first database configured to only store a current configuration of nodes in the data network, and a second database configured to only store a future configuration of the nodes in the data network, the first database configured to be synchronized with the data network by a controller using text-based configuration status reports in the form of CLI command sequences,
        a default widget library comprising a plurality of widgets,
        default registry data having entries, wherein the entries identify a default graphical representation for each data type of the set of data types, and the default graphical representation is defined by at least one predetermined widget from the default widget library, and
        customization registry data having at least one entry, wherein the at least one entry defines, based on customization input received in the graphical user interface, at least one key being associated with a customization registration, said at least one key identifying at least one element and/or sub element of the data model for which an alternative graphical representation is to be provided, and the alternative graphical representation is defined by the customization registration;
    receiving an input that identifies a portion of the data network of interest for display in the graphical user interface;
    generating a request for data from the data model based on the input;
    receiving the data from the data model, the data from the data model being representative for the portion of the data network of interest;
    generating graphical representations of current configurations of a subset of the devices in the portion of the data network of interest by determining, using the customization registry data, whether each element of the data from the data model is identified by the at least one key in the at least one entry, wherein:
        when it is determined that the element is identified by the at least one key in the at least one entry, generating the alternative graphical representation based on a combination of a current configuration of a device corresponding to the element from the configuration database and the customization registration that is associated with the at least one key, and
        when it is determined that the element is not identified by the at least one key in the at least one entry, generating the default graphical representation based on a combination of the current configuration of the device corresponding to the element from the configuration database and the at least one predetermined widget; and
    rendering, in the graphical user interface, the portion of the data network of interest using the graphical representations.

2. The method according to claim 1, wherein the at least one entry defining the at least one key being associated with the customization registration comprises the at least one key being associated with both the customization registration and at least one statement that identifies one or more instances of the at least one element and/or sub element of the data model for which the alternative graphical representation is to be provided.

3. The method according to claim 1, wherein the at least one entry defining the at least one key being associated with the customization registration comprises the at least one key being associated with both the customization registration and a keypath statement, said keypath statement defining a search path to a unique instance of the at least one element and/or sub element of the data model so as to provide customization of the unique instance of the at least one element and/or sub element of the data model.

4. The method according to claim 1, wherein the at least one entry defining the at least one key being associated with the customization registration comprises the at least one key being associated with both the customization registration and a tagpath statement, said tagpath statement defining a search path to all instances of a unique element or sub-element of the data model so as to provide the alternative graphical representation for all the instances of the unique element or sub element.

5. The method according to claim 1, wherein the customization registration is related to a predetermined translation altering the graphical representation of the at least one element and/or sub element of the data model with regard to textual representation of at least one label or at least one argument of the at least one element and/or sub element of the data model.

6. The method according to claim 1, wherein the customization registration is related to at least one customization selected from a group of customizations comprising a predetermined translation, a widget life cycle handler and a widget contextual setting, said customizations altering the graphical representation of the at least one element and/or sub element of the data model with regard to at least one property of a number of properties comprising life cycle behaviour, textual representation and graphical appearance.

7. The method according to claim 1, wherein the at least one entry defining the at least one key being associated with the customization registration comprises the at least one key being associated with both the customization registration and a tag statement, said tag statement defining in which view of a number of preconfigurable views that the alternative graphical representation is to be provided.

8. The method according to claim 3, wherein the at least one entry further defines a matcher function, said matcher function using one or more operators to operate on parameters, the parameters comprising:
 the at least one entry that is associated with both the customization registration and the keypath statement, the at least one entry being selected from a group of entries,
 at least one bundle that is associated with customization registrations, and
 at least one tag that is associated with the customization registrations;
 wherein the matcher function comprises identifying, based on the parameters, at least one unique element and/or unique sub-elements for which the alternative graphical representation is to be provided.

9. The method according to claim 3, wherein at least one entry further defines a bundle statement, said bundle statement grouping a number of registry entries selected from a group comprising at least one tagpath entry with associated customization registrations, at least one keypath entry with associated customization registrations, at least one tag entry with associated customization registrations, and at least one matcher function entry.

10. The method according to claim 1, further comprising: assembling the graphical representations logically before rendering the portion of the data network of interest using the graphical representations.

11. The method according to claim 1, further comprising: storing a custom widget library comprising at least one custom widget.

12. The method according to claim 11, wherein the alternative graphical representation being defined by the customization registration comprises the customization registration defining the alternative graphical representation in the form of a custom widget from the custom widget library.

13. The method according to claim 1, wherein the generating the request for the data from the data model based on the input further comprises generating a request for at least a portion of the configuration information from the configuration database based on the input, wherein the at least the portion of the configuration information identifies the current configurations of the subset of the devices in the portion of the data network of interest.

14. The method according to claim 13, wherein the receiving the data from the data model further comprises receiving the at least the portion of the configuration information from the configuration database the at least the portion of the configuration information received from the configuration data base being associated with the data received from the data model.

15. The method according to claim 14, wherein the rendering, in the graphical user interface, the portion of the data network of interest using the graphical representations further comprises rendering the current configurations of the subset of the devices in the portion of the data network of interest using the graphical representations in combination with the at least the portion of the configuration information received from the configuration database.

16. The method according to claim 1, wherein the data model comprises a data model representative of network elements and services.

17. The method according to claim 1, wherein the data model is formatted using extensible mark-up language format.

18. The method according to claim 1, wherein the data model data model is a YANG based data model, comprising one or more YANG schemas representative of the data network.

19. The method according to claim 18, wherein the each of the one or more YANG schemas of the YANG based model, having declared at least one YANG statement and/or YANG sub-statement selected from a group of YANG statements comprising: a module, a container, a leaf, a list, a leaf list, an action, a grouping.

20. A method for providing a graphical user interface in a web browser of a client, said graphical user interface being associated to a network management system for monitoring and configuring a data network, the method comprising:
 storing, at a server, information comprising:
  a data model representative of the data network, wherein said data model having a plurality of elements corresponding to devices in the data network, each of the plurality of elements comprises one or more sub elements, and each of the one or more sub elements is associated to a data type of a set of data types, and
  a configuration database comprising configuration information, the configuration database comprising a first database configured to only store a current configuration of nodes in the data network, and a second database configured to only store a future configuration of the nodes in the data network, the first database configured to be synchronized with the data network by a controller using text-based configuration status reports in the form of CLI command sequences,
 storing, at the client, other information comprising:
  a default widget library comprising a plurality of widgets,
  default registry data having entries, wherein the entries identify a default graphical representation for each data type of the set of data types, and the default graphical representation is defined by at least one predetermined widget from the default widget library, and
  customization registry data having at least one entry, wherein the at least one entry defines, based on customization input received in the graphical user interface, at least one key being associated with a customization registration, said at least one key identifying at least one element and/or sub element of the data model for which an alternative graphical representation is to be provided, and the alternative graphical representation is defined by the customization registration;
 generating for display a user input dialog in the web browser, said user input dialog being operable to receive an input identify a portion of the data network of interest for display in the graphical user interface;

receiving, at the client, the input identifying the portion of the data network of interest;

generating, at the client, a request to the server for data from the data model based on the input;

receiving, at the client, the data from the data model sent from the server, the data from the data model being representative for the portion of the data network of interest;

generating graphical representations of current configurations of a subset of the devices in the portion of the data network of interest by determining, using the customization registry data, whether each element of the data from the data model is identified by the at least one key in the at least one entry, wherein:

when it is determined that the element is identified by the at least one key in the at least one entry, generating the alternative graphical representation based on a combination of a current configuration of a device corresponding to the element from the configuration database and the customization registration that is associated with the at least one key, and when it is determined that the element is not identified by the at least one key in the at least one entry, generating the default graphical representation based on a combination of the current configuration of the device corresponding to the element from the configuration database and the at least one predetermined widget; and rendering, in the graphical user interface in the web browser of the client, the portion of the data network of interest using the graphical representations.

21. The method according to claim 20, further comprising:

formatting the graphical representations for the web browser.

22. The method according to claim 21, further comprising:

storing, at the client, HTML templates and wherein the formatting the graphical representations comprises formatting the graphical representations using the HTML templates.

23. A computer program product for providing a graphical user interface in a user equipment associated to a network management system for monitoring and/or configuring a data network, the computer program product comprising a non-volatile memory storing a computer program comprising computer-readable code which when executed by a processing unit of a user equipment causes the user equipment to perform operations comprising:

storing information comprising:

a data model representative of the data network, wherein said data model has a plurality of elements corresponding to devices in the data network, each of the plurality of elements comprises one or more sub elements, and each of the one or more sub elements is associated to a data type of a set of data types, a configuration database comprising configuration information, the configuration database comprising a first database configured to only store a current configuration of nodes in the data network, and a second database configured to only store a future configuration of the nodes in the data network, the first database configured to be synchronized with the data network by a controller using text-based configuration status reports in the form of CLI command sequences, a default widget library comprising a plurality of widgets, default registry data having entries, wherein the entries identify a default graphical representation for each data type of the set of data types, and the default graphical representation is defined by at least one predetermined widget from the default widget library, and customization registry data having at least one entry, wherein the at least one entry defines, based on customization input received in the graphical user interface, at least one key being associated with a customization registration, said at least one key identifying at least one element and/or sub element of the data model for which an alternative graphical representation is to be provided, and the alternative graphical representation is defined by the customization registration;

receiving an input that identifies a portion of the data network of interest for display in the graphical user interface;

generating a request for data from the data model based on the input;

receiving the data from the data model, the data from the data model being representative for the portion of the data network of interest;

generating graphical representations of current configurations of a subset of the devices in the portion of the data network of interest by determining, using the customization registry data, whether each element of the data from the data model is identified by the at least one key in the at least one entry, wherein:

when it is determined that the element is identified by the at least one key in the at least one entry, generating the alternative graphical representation based on a combination of a current configuration of a device corresponding to the element from the configuration database and the customization registration that is associated with the at least one key, and when it is determined that the element is not identified by the at least one key in the at least one entry, generating the default graphical representation based on a combination of the current configuration of the device corresponding to the element from the configuration database and the at least one predetermined widget; and rendering, in the graphical user interface, the portion of the data network of interest using the graphical representations.

24. A graphical user interface system of a user equipment associated to a network management system for monitoring and configuring data a data network, the graphical user interface comprising:

a link communicatively coupling the graphical user interface to a storage medium of the network management system, said storage medium of the network management system configured to store a data model representative of the data network, wherein said data model has a plurality of elements corresponding to devices in the data network, each of the plurality of elements comprises one or more sub elements, and each of the one or more sub elements is associated to a data type of a set of data types and to store configured to only store a current configuration of nodes in the data network, and a second database configured to only store a future configuration of the nodes in the data network, the first database configured to be synchronized with the data network by a controller using text-based configuration status reports in the form of CLI command sequences, a storage medium configured to store information comprising:
- a default widget library comprising a plurality of widgets,
- default registry data having entries, wherein the entries identify a default graphical representation for each data type of the set of data types, and the default graphical representation is defined by at least one predetermined widget from the default widget library, and
- customization registry data having at least one entry, wherein the at least one entry defines, based on customization input received in the graphical user interface, at least one key being associated with a customization registration, said at least one key identifying at least one element and/or sub element of the data model for which an alternative graphical representation is to be provided, and the alternative graphical representation is defined by the customization registration;

a client configured to:
- generate a user input dialog, the user input dialog being operable to receive an input identifying a portion of the data network of interest for display in the graphical user interface;
- receive the input identifying the portion of the data network of interest;
- generate a request for retrieving data, from the storage medium of the network management system, based on the input;
- receive the data from the storage medium of the network management system, said data being representative for the portion of the data network of interest;
- generate graphical representations of current configurations of a subset of the devices in the portion of the data network of interest by determining, using the customization registry data, whether each element of the data from the data model is identified by the at least one key in the at least one entry, wherein:
  - when it is determined that the element is identified by the at least one key in the at least one entry, generate the alternative graphical representation based on a combination of a current configuration of a device corresponding to the element from the configuration database and the customization registration that is associated with the at least one key, and
  - when it is determined that the element is not identified by the at least one key in the at least one entry, generate the default graphical representation based on a combination of the current configuration of the device corresponding to the element from the configuration database and the at least one predetermined widget; and
- render the portion of the data network of interest using the graphical representations.

* * * * *